US012062235B2

(12) United States Patent
Drummond et al.

(10) Patent No.: US 12,062,235 B2
(45) Date of Patent: *Aug. 13, 2024

(54) PROVIDING TRAVEL-BASED AUGMENTED REALITY CONTENT WITH A CAPTURED IMAGE

(71) Applicant: Snap Inc., Santa Monica, CA (US)

(72) Inventors: Virginia Drummond, Venice, CA (US); Jean Luo, Seattle, WA (US); Alek Matthiessen, Marina Del Rey, CA (US); Celia Nicole Mourkogiannis, Los Angeles, CA (US)

(73) Assignee: Snap Inc., Santa Monica, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 18/142,696

(22) Filed: May 3, 2023

(65) Prior Publication Data

US 2023/0274542 A1 Aug. 31, 2023

Related U.S. Application Data

(63) Continuation of application No. 17/722,917, filed on Apr. 18, 2022, now Pat. No. 11,676,378, which is a (Continued)

(51) Int. Cl.
*G06T 19/00* (2011.01)
*G06F 3/0482* (2013.01)
(Continued)

(52) U.S. Cl.
CPC ............ *G06V 20/20* (2022.01); *G06F 3/0482* (2013.01); *G06T 19/006* (2013.01); *H04W 4/021* (2013.01)

(58) Field of Classification Search
None
See application file for complete search history.

(56) References Cited

U.S. PATENT DOCUMENTS 666,223 A 1/1901 Shedlock
4,581,634 A 4/1986 Williams
(Continued)

FOREIGN PATENT DOCUMENTS

CA 2887596 A1 7/2015
CN 115867882 3/2023
(Continued)

OTHER PUBLICATIONS

Pokric et al., "Augmented Reality Based Smart City Services Using Secure IoT Infrastructure" IEEE, 2014. (Year: 2014).*
(Continued)

*Primary Examiner* — Nicholas R Wilson
(74) *Attorney, Agent, or Firm* — Schwegman Lundberg & Woessner, P.A.

(57) ABSTRACT

Aspects of the present disclosure involve a system comprising a computer-readable storage medium storing a program and method for providing augmented reality content with a captured image in association with traveling, in accordance with some example embodiments. The program and method provide for receiving, by a messaging application running on a device of a user, a request to scan an image captured by a device camera; determining, in response to the receiving, a travel parameter associated with the request and an attribute of an object depicted in the image; obtaining supplemental content based on the travel parameter and on the attribute; and displaying an augmented reality content item, which includes the supplemental content, with the captured image.

20 Claims, 11 Drawing Sheets

Related U.S. Application Data continuation of application No. 17/149,428, filed on Jan. 14, 2021, now Pat. No. 11,308,327.

(60) Provisional application No. 63/045,436, filed on Jun. 29, 2020.

(51) Int. Cl.
  *G06V 20/20* (2022.01)
  *H04W 4/021* (2018.01)

(56) References Cited

U.S. PATENT DOCUMENTS

| | | |
|---|---|---|
| 4,975,690 A | 12/1990 | Torres |
| 5,072,412 A | 12/1991 | Henderson, Jr. et al. |
| 5,493,692 A | 2/1996 | Theimer et al. |
| 5,713,073 A | 1/1998 | Warsta |
| 5,754,939 A | 5/1998 | Herz et al. |
| 5,855,008 A | 12/1998 | Goldhaber et al. |
| 5,883,639 A | 3/1999 | Walton et al. |
| 5,999,932 A | 12/1999 | Paul |
| 6,012,098 A | 1/2000 | Bayeh et al. |
| 6,014,090 A | 1/2000 | Rosen et al. |
| 6,029,141 A | 2/2000 | Bezos et al. |
| 6,038,295 A | 3/2000 | Mattes |
| 6,049,711 A | 4/2000 | Yehezkel et al. |
| 6,154,764 A | 11/2000 | Nitta et al. |
| 6,167,435 A | 12/2000 | Druckenmiller et al. |
| 6,204,840 B1 | 3/2001 | Petelycky et al. |
| 6,205,432 B1 | 3/2001 | Gabbard et al. |
| 6,216,141 B1 | 4/2001 | Straub et al. |
| 6,285,381 B1 | 9/2001 | Sawano et al. |
| 6,285,987 B1 | 9/2001 | Roth et al. |
| 6,310,694 B1 | 10/2001 | Okimoto et al. |
| 6,317,789 B1 | 11/2001 | Rakavy et al. |
| 6,334,149 B1 | 12/2001 | Davis, Jr. et al. |
| 6,349,203 B1 | 2/2002 | Asaoka et al. |
| 6,353,170 B1 | 3/2002 | Eyzaguirre et al. |
| 6,446,004 B1 | 9/2002 | Cao et al. |
| 6,449,657 B2 | 9/2002 | Stanbach et al. |
| 6,456,852 B2 | 9/2002 | Bar et al. |
| 6,484,196 B1 | 11/2002 | Maurille |
| 6,487,601 B1 | 11/2002 | Hubacher et al. |
| 6,523,008 B1 | 2/2003 | Avrunin |
| 6,542,749 B2 | 4/2003 | Tanaka et al. |
| 6,549,768 B1 | 4/2003 | Fraccaroli |
| 6,618,593 B1 | 9/2003 | Drutman et al. |
| 6,622,174 B1 | 9/2003 | Ukita et al. |
| 6,631,463 B1 | 10/2003 | Floyd et al. |
| 6,636,247 B1 | 10/2003 | Hamzy et al. |
| 6,636,855 B2 | 10/2003 | Holloway et al. |
| 6,643,684 B1 | 11/2003 | Malkin et al. |
| 6,658,095 B1 | 12/2003 | Yoakum et al. |
| 6,665,531 B1 | 12/2003 | Soderbacka et al. |
| 6,668,173 B2 | 12/2003 | Greene |
| 6,684,238 B1 | 1/2004 | Dutta |
| 6,684,257 B1 | 1/2004 | Camut et al. |
| 6,698,020 B1 | 2/2004 | Zigmond et al. |
| 6,700,506 B1 | 3/2004 | Winkler |
| 6,720,860 B1 | 4/2004 | Narayanaswami |
| 6,724,403 B1 | 4/2004 | Santoro et al. |
| 6,757,713 B1 | 6/2004 | Ogilvie et al. |
| 6,832,222 B1 | 12/2004 | Zimowski |
| 6,834,195 B2 | 12/2004 | Brandenberg et al. |
| 6,836,792 B1 | 12/2004 | Chen |
| 6,898,626 B2 | 5/2005 | Ohashi |
| 6,959,324 B1 | 10/2005 | Kubik et al. |
| 6,970,088 B2 | 11/2005 | Kovach |
| 6,970,907 B1 | 11/2005 | Ullmann et al. |
| 6,980,909 B2 | 12/2005 | Root et al. |
| 6,981,040 B1 | 12/2005 | Konig et al. |
| 7,020,494 B2 | 3/2006 | Spriestersbach et al. |
| 7,027,124 B2 | 4/2006 | Foote et al. |
| 7,072,963 B2 | 7/2006 | Anderson et al. |
| 7,085,571 B2 | 8/2006 | Kalhan et al. |
| 7,110,744 B2 | 9/2006 | Freeny, Jr. |
| 7,124,164 B1 | 10/2006 | Chemtob |
| 7,149,893 B1 | 12/2006 | Leonard et al. |
| 7,173,651 B1 | 2/2007 | Knowles |
| 7,188,143 B2 | 3/2007 | Szeto |
| 7,203,380 B2 | 4/2007 | Chiu et al. |
| 7,206,568 B2 | 4/2007 | Sudit |
| 7,227,937 B1 | 6/2007 | Yoakum et al. |
| 7,237,002 B1 | 6/2007 | Estrada et al. |
| 7,240,089 B2 | 7/2007 | Boudreau |
| 7,269,426 B2 | 9/2007 | Kokkonen et al. |
| 7,280,658 B2 | 10/2007 | Amini et al. |
| 7,315,823 B2 | 1/2008 | Brondrup |
| 7,349,768 B2 | 3/2008 | Bruce et al. |
| 7,356,564 B2 | 4/2008 | Hartselle et al. |
| 7,394,345 B1 | 7/2008 | Ehlinger et al. |
| 7,411,493 B2 | 8/2008 | Smith |
| 7,423,580 B2 | 9/2008 | Markhovsky et al. |
| 7,454,442 B2 | 11/2008 | Cobleigh et al. |
| 7,508,419 B2 | 3/2009 | Toyama et al. |
| 7,512,649 B2 | 3/2009 | Faybishenko et al. |
| 7,519,670 B2 | 4/2009 | Hagale et al. |
| 7,535,890 B2 | 5/2009 | Rojas |
| 7,546,554 B2 | 6/2009 | Chiu et al. |
| 7,607,096 B2 | 10/2009 | Oreizy et al. |
| 7,639,943 B1 | 12/2009 | Kalajan |
| 7,650,231 B2 | 1/2010 | Gadler |
| 7,668,537 B2 | 2/2010 | DeVries |
| 7,770,137 B2 | 8/2010 | Forbes et al. |
| 7,778,973 B2 | 8/2010 | Choi |
| 7,779,444 B2 | 8/2010 | Glad |
| 7,787,886 B2 | 8/2010 | Markhovsky et al. |
| 7,796,946 B2 | 9/2010 | Eisenbach |
| 7,801,954 B2 | 9/2010 | Cadiz et al. |
| 7,856,360 B2 | 12/2010 | Kramer et al. |
| 8,001,204 B2 | 8/2011 | Burtner et al. |
| 8,032,586 B2 | 10/2011 | Challenger et al. |
| 8,082,255 B1 | 12/2011 | Carlson, Jr. et al. |
| 8,090,351 B2 | 1/2012 | Klein |
| 8,098,904 B2 | 1/2012 | Ioffe et al. |
| 8,099,109 B2 | 1/2012 | Altman et al. |
| 8,112,716 B2 | 2/2012 | Kobayashi |
| 8,131,597 B2 | 3/2012 | Hudetz |
| 8,135,166 B2 | 3/2012 | Rhoads |
| 8,136,028 B1 | 3/2012 | Loeb et al. |
| 8,146,001 B1 | 3/2012 | Reese |
| 8,161,115 B2 | 4/2012 | Yamamoto |
| 8,161,417 B1 | 4/2012 | Lee |
| 8,195,203 B1 | 6/2012 | Tseng |
| 8,199,747 B2 | 6/2012 | Rojas et al. |
| 8,208,943 B2 | 6/2012 | Petersen |
| 8,214,443 B2 | 7/2012 | Hamburg |
| 8,234,350 B1 | 7/2012 | Gu et al. |
| 8,276,092 B1 | 9/2012 | Narayanan et al. |
| 8,279,319 B2 | 10/2012 | Date |
| 8,280,406 B2 | 10/2012 | Ziskind et al. |
| 8,285,199 B2 | 10/2012 | Hsu et al. |
| 8,287,380 B2 | 10/2012 | Nguyen et al. |
| 8,301,159 B2 | 10/2012 | Hamynen et al. |
| 8,306,922 B1 | 11/2012 | Kunal et al. |
| 8,312,086 B2 | 11/2012 | Velusamy et al. |
| 8,312,097 B1 | 11/2012 | Siegel et al. |
| 8,326,315 B2 | 12/2012 | Phillips et al. |
| 8,326,327 B2 | 12/2012 | Hymel et al. |
| 8,332,475 B2 | 12/2012 | Rosen et al. |
| 8,352,546 B1 | 1/2013 | Dollard |
| 8,379,130 B2 | 2/2013 | Forutanpour et al. |
| 8,385,950 B1 | 2/2013 | Wagner et al. |
| 8,402,097 B2 | 3/2013 | Szeto |
| 8,405,773 B2 | 3/2013 | Hayashi et al. |
| 8,418,067 B2 | 4/2013 | Cheng et al. |
| 8,423,409 B2 | 4/2013 | Rao |
| 8,471,914 B2 | 6/2013 | Sakiyama et al. |
| 8,472,935 B1 | 6/2013 | Fujisaki |
| 8,510,383 B2 | 8/2013 | Hurley et al. |
| 8,527,345 B2 | 9/2013 | Rothschild et al. |
| 8,554,627 B2 | 10/2013 | Svendsen et al. |
| 8,560,612 B2 | 10/2013 | Kilmer et al. |
| 8,594,680 B2 | 11/2013 | Ledlie et al. |

(56) References Cited

U.S. PATENT DOCUMENTS

| | | |
|---|---|---|
| 8,613,089 B1 | 12/2013 | Holloway et al. |
| 8,660,358 B1 | 2/2014 | Bergboer et al. |
| 8,660,369 B2 | 2/2014 | Llano et al. |
| 8,660,793 B2 | 2/2014 | Ngo et al. |
| 8,682,350 B2 | 3/2014 | Altman et al. |
| 8,718,333 B2 | 5/2014 | Wolf et al. |
| 8,724,622 B2 | 5/2014 | Rojas |
| 8,732,168 B2 | 5/2014 | Johnson |
| 8,744,523 B2 | 6/2014 | Fan et al. |
| 8,745,132 B2 | 6/2014 | Obradovich |
| 8,761,800 B2 | 6/2014 | Kuwahara |
| 8,768,876 B2 | 7/2014 | Shim et al. |
| 8,775,972 B2 | 7/2014 | Spiegel |
| 8,788,680 B1 | 7/2014 | Naik |
| 8,790,187 B2 | 7/2014 | Walker et al. |
| 8,797,415 B2 | 8/2014 | Arnold |
| 8,798,646 B1 | 8/2014 | Wang et al. |
| 8,856,349 B2 | 10/2014 | Jain et al. |
| 8,874,677 B2 | 10/2014 | Rosen et al. |
| 8,886,227 B2 | 11/2014 | Schmidt et al. |
| 8,909,679 B2 | 12/2014 | Root et al. |
| 8,909,725 B1 | 12/2014 | Sehn |
| 8,972,357 B2 | 3/2015 | Shim et al. |
| 8,995,433 B2 | 3/2015 | Rojas |
| 9,015,285 B1 | 4/2015 | Ebsen et al. |
| 9,020,745 B2 | 4/2015 | Johnston et al. |
| 9,040,574 B2 | 5/2015 | Wang et al. |
| 9,055,416 B2 | 6/2015 | Rosen et al. |
| 9,094,137 B1 | 7/2015 | Sehn et al. |
| 9,100,806 B2 | 8/2015 | Rosen et al. |
| 9,100,807 B2 | 8/2015 | Rosen et al. |
| 9,113,301 B1 | 8/2015 | Spiegel et al. |
| 9,119,027 B2 | 8/2015 | Sharon et al. |
| 9,123,074 B2 | 9/2015 | Jacobs et al. |
| 9,143,382 B2 | 9/2015 | Bhogal et al. |
| 9,143,681 B1 | 9/2015 | Ebsen et al. |
| 9,152,477 B1 | 10/2015 | Campbell et al. |
| 9,191,776 B2 | 11/2015 | Root et al. |
| 9,204,252 B2 | 12/2015 | Root |
| 9,225,897 B1 | 12/2015 | Sehn et al. |
| 9,258,459 B2 | 2/2016 | Hartley |
| 9,344,606 B2 | 5/2016 | Hartley et al. |
| 9,385,983 B1 | 7/2016 | Sehn |
| 9,396,354 B1 | 7/2016 | Murphy et al. |
| 9,407,712 B1 | 8/2016 | Sehn |
| 9,407,816 B1 | 8/2016 | Sehn |
| 9,430,783 B1 | 8/2016 | Sehn |
| 9,439,041 B2 | 9/2016 | Parvizi et al. |
| 9,443,227 B2 | 9/2016 | Evans et al. |
| 9,450,907 B2 | 9/2016 | Pridmore et al. |
| 9,459,778 B2 | 10/2016 | Hogeg et al. |
| 9,489,661 B2 | 11/2016 | Evans et al. |
| 9,491,134 B2 | 11/2016 | Rosen et al. |
| 9,532,171 B2 | 12/2016 | Allen et al. |
| 9,537,811 B2 | 1/2017 | Allen et al. |
| 9,628,950 B1 | 4/2017 | Noeth et al. |
| 9,710,821 B2 | 7/2017 | Heath |
| 9,854,219 B2 | 12/2017 | Sehn |
| 10,529,139 B1 | 1/2020 | Greene |
| 10,674,311 B1 | 6/2020 | Bouba et al. |
| 10,893,385 B1 | 1/2021 | Berardino et al. |
| 10,936,066 B1 | 3/2021 | Jaureguiberry et al. |
| 10,939,246 B1 | 3/2021 | Dancie et al. |
| 10,945,098 B2 | 3/2021 | Dancie et al. |
| 11,032,670 B1 | 6/2021 | Baylin et al. |
| 11,039,270 B2 | 6/2021 | Bouba et al. |
| 11,166,123 B1 | 11/2021 | Guillaume |
| 11,275,439 B2 | 3/2022 | Jaureguiberry et al. |
| 11,294,936 B1 | 4/2022 | Jaureguiberry |
| 11,307,747 B2 | 4/2022 | Dancie et al. |
| 11,308,327 B2 | 4/2022 | Drummond et al. |
| 11,676,378 B2 | 6/2023 | Drummond et al. |
| 2002/0047868 A1 | 4/2002 | Miyazawa |
| 2002/0078456 A1 | 6/2002 | Hudson et al. |
| 2002/0087631 A1 | 7/2002 | Sharma |
| 2002/0097257 A1 | 7/2002 | Miller et al. |
| 2002/0122659 A1 | 9/2002 | Mcgrath et al. |
| 2002/0128047 A1 | 9/2002 | Gates |
| 2002/0144154 A1 | 10/2002 | Tomkow |
| 2003/0001846 A1 | 1/2003 | Davis et al. |
| 2003/0016247 A1 | 1/2003 | Lai et al. |
| 2003/0017823 A1 | 1/2003 | Mager et al. |
| 2003/0020623 A1 | 1/2003 | Cao et al. |
| 2003/0023874 A1 | 1/2003 | Prokupets et al. |
| 2003/0037124 A1 | 2/2003 | Yamaura et al. |
| 2003/0052925 A1 | 3/2003 | Daimon et al. |
| 2003/0101230 A1 | 5/2003 | Benschoter et al. |
| 2003/0110503 A1 | 6/2003 | Perkes |
| 2003/0126215 A1 | 7/2003 | Udell |
| 2003/0148773 A1 | 8/2003 | Spriestersbach et al. |
| 2003/0164856 A1 | 9/2003 | Prager et al. |
| 2003/0229607 A1 | 12/2003 | Zellweger et al. |
| 2004/0027371 A1 | 2/2004 | Jaeger |
| 2004/0064429 A1 | 4/2004 | Hirstius et al. |
| 2004/0078367 A1 | 4/2004 | Anderson et al. |
| 2004/0111467 A1 | 6/2004 | Willis |
| 2004/0158739 A1 | 8/2004 | Wakai et al. |
| 2004/0189465 A1 | 9/2004 | Capobianco et al. |
| 2004/0203959 A1 | 10/2004 | Coombes |
| 2004/0215625 A1 | 10/2004 | Svendsen et al. |
| 2004/0243531 A1 | 12/2004 | Dean |
| 2004/0243688 A1 | 12/2004 | Wugofski |
| 2005/0021444 A1 | 1/2005 | Bauer et al. |
| 2005/0022211 A1 | 1/2005 | Veselov et al. |
| 2005/0048989 A1 | 3/2005 | Jung |
| 2005/0078804 A1 | 4/2005 | Yomoda |
| 2005/0097176 A1 | 5/2005 | Schatz et al. |
| 2005/0102381 A1 | 5/2005 | Jiang et al. |
| 2005/0104976 A1 | 5/2005 | Currans |
| 2005/0114783 A1 | 5/2005 | Szeto |
| 2005/0119936 A1 | 6/2005 | Buchanan et al. |
| 2005/0122405 A1 | 6/2005 | Voss et al. |
| 2005/0193340 A1 | 9/2005 | Amburgey et al. |
| 2005/0193345 A1 | 9/2005 | Klassen et al. |
| 2005/0198128 A1 | 9/2005 | Anderson |
| 2005/0223066 A1 | 10/2005 | Buchheit et al. |
| 2005/0288954 A1 | 12/2005 | McCarthy et al. |
| 2006/0026067 A1 | 2/2006 | Nicholas et al. |
| 2006/0107297 A1 | 5/2006 | Toyama et al. |
| 2006/0114338 A1 | 6/2006 | Rothschild |
| 2006/0119882 A1 | 6/2006 | Harris et al. |
| 2006/0242239 A1 | 10/2006 | Morishima et al. |
| 2006/0252438 A1 | 11/2006 | Ansamaa et al. |
| 2006/0265417 A1 | 11/2006 | Amato et al. |
| 2006/0270419 A1 | 11/2006 | Crowley et al. |
| 2006/0287878 A1 | 12/2006 | Wadhwa et al. |
| 2007/0004426 A1 | 1/2007 | Pfleging et al. |
| 2007/0038715 A1 | 2/2007 | Collins et al. |
| 2007/0040931 A1 | 2/2007 | Nishizawa |
| 2007/0073517 A1 | 3/2007 | Panje |
| 2007/0073823 A1 | 3/2007 | Cohen et al. |
| 2007/0075898 A1 | 4/2007 | Markhovsky et al. |
| 2007/0082707 A1 | 4/2007 | Flynt et al. |
| 2007/0136228 A1 | 6/2007 | Petersen |
| 2007/0192128 A1 | 8/2007 | Celestini |
| 2007/0198340 A1 | 8/2007 | Lucovsky et al. |
| 2007/0198495 A1 | 8/2007 | Buron et al. |
| 2007/0208751 A1 | 9/2007 | Cowan et al. |
| 2007/0210936 A1 | 9/2007 | Nicholson |
| 2007/0214180 A1 | 9/2007 | Crawford |
| 2007/0214216 A1 | 9/2007 | Carrer et al. |
| 2007/0233556 A1 | 10/2007 | Koningstein |
| 2007/0233801 A1 | 10/2007 | Eren et al. |
| 2007/0233859 A1 | 10/2007 | Zhao et al. |
| 2007/0243887 A1 | 10/2007 | Bandhole et al. |
| 2007/0244750 A1 | 10/2007 | Grannan et al. |
| 2007/0255456 A1 | 11/2007 | Funayama |
| 2007/0281690 A1 | 12/2007 | Altman et al. |
| 2008/0022329 A1 | 1/2008 | Glad |
| 2008/0025701 A1 | 1/2008 | Ikeda |
| 2008/0032703 A1 | 2/2008 | Krumm et al. |
| 2008/0033930 A1 | 2/2008 | Warren |
| 2008/0043041 A2 | 2/2008 | Hedenstroem et al. |
| 2008/0049704 A1 | 2/2008 | Witteman et al. |

(56) References Cited

U.S. PATENT DOCUMENTS

| | | |
|---|---|---|
| 2008/0062141 A1 | 3/2008 | Chandhri |
| 2008/0076505 A1 | 3/2008 | Ngyen et al. |
| 2008/0092233 A1 | 4/2008 | Tian et al. |
| 2008/0094387 A1 | 4/2008 | Chen |
| 2008/0104503 A1 | 5/2008 | Beall et al. |
| 2008/0109844 A1 | 5/2008 | Baldeschweiler et al. |
| 2008/0120409 A1 | 5/2008 | Sun et al. |
| 2008/0147730 A1 | 6/2008 | Lee et al. |
| 2008/0148150 A1 | 6/2008 | Mall |
| 2008/0158230 A1 | 7/2008 | Sharma et al. |
| 2008/0168033 A1 | 7/2008 | Ott et al. |
| 2008/0168489 A1 | 7/2008 | Schraga |
| 2008/0189177 A1 | 8/2008 | Anderton et al. |
| 2008/0207176 A1 | 8/2008 | Brackbill et al. |
| 2008/0208692 A1 | 8/2008 | Garaventi et al. |
| 2008/0214210 A1 | 9/2008 | Rasanen et al. |
| 2008/0222545 A1 | 9/2008 | Lemay |
| 2008/0255976 A1 | 10/2008 | Altberg et al. |
| 2008/0256446 A1 | 10/2008 | Yamamoto |
| 2008/0256577 A1 | 10/2008 | Funaki et al. |
| 2008/0266421 A1 | 10/2008 | Takahata et al. |
| 2008/0270938 A1 | 10/2008 | Carlson |
| 2008/0288338 A1 | 11/2008 | Wiseman et al. |
| 2008/0306826 A1 | 12/2008 | Kramer et al. |
| 2008/0313329 A1 | 12/2008 | Wang et al. |
| 2008/0313346 A1 | 12/2008 | Kujawa et al. |
| 2008/0318616 A1 | 12/2008 | Chipalkatti et al. |
| 2009/0006191 A1 | 1/2009 | Arankalle et al. |
| 2009/0006565 A1 | 1/2009 | Velusamy et al. |
| 2009/0015703 A1 | 1/2009 | Kim et al. |
| 2009/0024956 A1 | 1/2009 | Kobayashi |
| 2009/0030774 A1 | 1/2009 | Rothschild et al. |
| 2009/0030999 A1 | 1/2009 | Gatzke et al. |
| 2009/0040324 A1 | 2/2009 | Nonaka |
| 2009/0042588 A1 | 2/2009 | Lottin et al. |
| 2009/0058822 A1 | 3/2009 | Chaudhri |
| 2009/0079846 A1 | 3/2009 | Chou |
| 2009/0089678 A1 | 4/2009 | Sacco et al. |
| 2009/0089710 A1 | 4/2009 | Wood et al. |
| 2009/0093261 A1 | 4/2009 | Ziskind |
| 2009/0132341 A1 | 5/2009 | Klinger |
| 2009/0132453 A1 | 5/2009 | Hangartner et al. |
| 2009/0132665 A1 | 5/2009 | Thomsen et al. |
| 2009/0148045 A1 | 6/2009 | Lee et al. |
| 2009/0153492 A1 | 6/2009 | Popp |
| 2009/0157450 A1 | 6/2009 | Athsani et al. |
| 2009/0157752 A1 | 6/2009 | Gonzalez |
| 2009/0160970 A1 | 6/2009 | Fredlund et al. |
| 2009/0163182 A1 | 6/2009 | Gatti et al. |
| 2009/0177299 A1 | 7/2009 | Van De Sluis |
| 2009/0192900 A1 | 7/2009 | Collision |
| 2009/0199242 A1 | 8/2009 | Johnson et al. |
| 2009/0215469 A1 | 8/2009 | Fisher et al. |
| 2009/0232354 A1 | 9/2009 | Camp, Jr. et al. |
| 2009/0234815 A1 | 9/2009 | Boerries et al. |
| 2009/0239552 A1 | 9/2009 | Churchill et al. |
| 2009/0249222 A1 | 10/2009 | Schmidt et al. |
| 2009/0249244 A1 | 10/2009 | Robinson et al. |
| 2009/0265647 A1 | 10/2009 | Martin et al. |
| 2009/0288022 A1 | 11/2009 | Almstrand et al. |
| 2009/0291672 A1 | 11/2009 | Treves et al. |
| 2009/0292608 A1 | 11/2009 | Polachek |
| 2009/0319607 A1 | 12/2009 | Belz et al. |
| 2009/0327073 A1 | 12/2009 | Li |
| 2010/0062794 A1 | 3/2010 | Han |
| 2010/0082427 A1 | 4/2010 | Burgener et al. |
| 2010/0082693 A1 | 4/2010 | Hugg et al. |
| 2010/0100568 A1 | 4/2010 | Papin et al. |
| 2010/0113065 A1 | 5/2010 | Narayan et al. |
| 2010/0130233 A1 | 5/2010 | Parker |
| 2010/0131880 A1 | 5/2010 | Lee et al. |
| 2010/0131895 A1 | 5/2010 | Wohlert |
| 2010/0153144 A1 | 6/2010 | Miller et al. |
| 2010/0159944 A1 | 6/2010 | Pascal et al. |
| 2010/0161658 A1 | 6/2010 | Hamynen et al. |
| 2010/0161831 A1 | 6/2010 | Haas et al. |
| 2010/0162149 A1 | 6/2010 | Sheleheda et al. |
| 2010/0183280 A1 | 7/2010 | Beauregard et al. |
| 2010/0185552 A1 | 7/2010 | Deluca et al. |
| 2010/0185665 A1 | 7/2010 | Horn et al. |
| 2010/0191631 A1 | 7/2010 | Weidmann |
| 2010/0197318 A1 | 8/2010 | Petersen et al. |
| 2010/0197319 A1 | 8/2010 | Petersen et al. |
| 2010/0198683 A1 | 8/2010 | Aarabi |
| 2010/0198694 A1 | 8/2010 | Muthukrishnan |
| 2010/0198826 A1 | 8/2010 | Petersen et al. |
| 2010/0198828 A1 | 8/2010 | Petersen et al. |
| 2010/0198862 A1 | 8/2010 | Jennings et al. |
| 2010/0198870 A1 | 8/2010 | Petersen et al. |
| 2010/0198917 A1 | 8/2010 | Petersen et al. |
| 2010/0201482 A1 | 8/2010 | Robertson et al. |
| 2010/0201536 A1 | 8/2010 | Robertson et al. |
| 2010/0214436 A1 | 8/2010 | Kim et al. |
| 2010/0223128 A1 | 9/2010 | Dukellis et al. |
| 2010/0223343 A1 | 9/2010 | Bosan et al. |
| 2010/0250109 A1 | 9/2010 | Johnston et al. |
| 2010/0257196 A1 | 10/2010 | Waters et al. |
| 2010/0259386 A1 | 10/2010 | Holley et al. |
| 2010/0273509 A1 | 10/2010 | Sweeney et al. |
| 2010/0281045 A1 | 11/2010 | Dean |
| 2010/0306669 A1 | 12/2010 | Della Pasqua |
| 2011/0004071 A1 | 1/2011 | Faiola et al. |
| 2011/0010205 A1 | 1/2011 | Richards |
| 2011/0029512 A1 | 2/2011 | Folgner et al. |
| 2011/0040783 A1 | 2/2011 | Uemichi et al. |
| 2011/0040804 A1 | 2/2011 | Peirce et al. |
| 2011/0050909 A1 | 3/2011 | Ellenby et al. |
| 2011/0050915 A1 | 3/2011 | Wang et al. |
| 2011/0064388 A1 | 3/2011 | Brown et al. |
| 2011/0066743 A1 | 3/2011 | Hurley et al. |
| 2011/0083101 A1 | 4/2011 | Sharon et al. |
| 2011/0102630 A1 | 5/2011 | Rukes |
| 2011/0119133 A1 | 5/2011 | Igelman et al. |
| 2011/0137881 A1 | 6/2011 | Cheng et al. |
| 2011/0145564 A1 | 6/2011 | Moshir et al. |
| 2011/0159890 A1 | 6/2011 | Fortescue et al. |
| 2011/0164163 A1 | 7/2011 | Bilbrey et al. |
| 2011/0197194 A1 | 8/2011 | D'Angelo et al. |
| 2011/0202598 A1 | 8/2011 | Evans et al. |
| 2011/0202968 A1 | 8/2011 | Nurmi |
| 2011/0211534 A1 | 9/2011 | Schmidt et al. |
| 2011/0213845 A1 | 9/2011 | Logan et al. |
| 2011/0215966 A1 | 9/2011 | Kim et al. |
| 2011/0225048 A1 | 9/2011 | Nair |
| 2011/0238763 A1 | 9/2011 | Shin et al. |
| 2011/0255736 A1 | 10/2011 | Thompson et al. |
| 2011/0273575 A1 | 11/2011 | Lee |
| 2011/0282799 A1 | 11/2011 | Huston |
| 2011/0283188 A1 | 11/2011 | Farrenkopf |
| 2011/0314419 A1 | 12/2011 | Dunn et al. |
| 2011/0320373 A1 | 12/2011 | Lee et al. |
| 2012/0028659 A1 | 2/2012 | Whitney et al. |
| 2012/0033718 A1 | 2/2012 | Kauffman et al. |
| 2012/0036015 A1 | 2/2012 | Sheikh |
| 2012/0036443 A1 | 2/2012 | Ohmori et al. |
| 2012/0054797 A1 | 3/2012 | Skog et al. |
| 2012/0059722 A1 | 3/2012 | Rao |
| 2012/0062805 A1 | 3/2012 | Candelore |
| 2012/0084731 A1 | 4/2012 | Filman et al. |
| 2012/0084835 A1 | 4/2012 | Thomas et al. |
| 2012/0099800 A1 | 4/2012 | Llano et al. |
| 2012/0108293 A1 | 5/2012 | Law et al. |
| 2012/0110096 A1 | 5/2012 | Smarr et al. |
| 2012/0113143 A1 | 5/2012 | Adhikari et al. |
| 2012/0113272 A1 | 5/2012 | Hata |
| 2012/0123830 A1 | 5/2012 | Svendsen et al. |
| 2012/0123871 A1 | 5/2012 | Svendsen et al. |
| 2012/0123875 A1 | 5/2012 | Svendsen et al. |
| 2012/0124126 A1 | 5/2012 | Alcazar et al. |
| 2012/0124176 A1 | 5/2012 | Curtis et al. |
| 2012/0124458 A1 | 5/2012 | Cruzada |
| 2012/0131507 A1 | 5/2012 | Sparandara et al. |
| 2012/0131512 A1 | 5/2012 | Takeuchi et al. |
| 2012/0143760 A1 | 6/2012 | Abulafia et al. |

(56) References Cited

U.S. PATENT DOCUMENTS

| | | |
|---|---|---|
| 2012/0150978 A1 | 6/2012 | Monaco |
| 2012/0165100 A1 | 6/2012 | Lalancette et al. |
| 2012/0166971 A1 | 6/2012 | Sachson et al. |
| 2012/0169855 A1 | 7/2012 | Oh |
| 2012/0172062 A1 | 7/2012 | Altman et al. |
| 2012/0173991 A1 | 7/2012 | Roberts et al. |
| 2012/0176401 A1 | 7/2012 | Hayward et al. |
| 2012/0184248 A1 | 7/2012 | Speede |
| 2012/0197724 A1 | 8/2012 | Kendall |
| 2012/0200743 A1 | 8/2012 | Blanchflower et al. |
| 2012/0209924 A1 | 8/2012 | Evans et al. |
| 2012/0210244 A1 | 8/2012 | De Francisco et al. |
| 2012/0212632 A1 | 8/2012 | Mate et al. |
| 2012/0220264 A1 | 8/2012 | Kawabata |
| 2012/0226748 A1 | 9/2012 | Bosworth et al. |
| 2012/0233000 A1 | 9/2012 | Fisher et al. |
| 2012/0236162 A1 | 9/2012 | Imamura |
| 2012/0239761 A1 | 9/2012 | Linner et al. |
| 2012/0250951 A1 | 10/2012 | Chen |
| 2012/0252418 A1 | 10/2012 | Kandekar et al. |
| 2012/0254325 A1 | 10/2012 | Majeti et al. |
| 2012/0278387 A1 | 11/2012 | Garcia et al. |
| 2012/0278692 A1 | 11/2012 | Shi |
| 2012/0290637 A1 | 11/2012 | Perantatos et al. |
| 2012/0299954 A1 | 11/2012 | Wada et al. |
| 2012/0304052 A1 | 11/2012 | Tanaka et al. |
| 2012/0304080 A1 | 11/2012 | Wormald et al. |
| 2012/0307096 A1 | 12/2012 | Ford et al. |
| 2012/0307112 A1 | 12/2012 | Kunishige et al. |
| 2012/0319904 A1 | 12/2012 | Lee et al. |
| 2012/0323933 A1 | 12/2012 | He et al. |
| 2012/0324018 A1 | 12/2012 | Metcalf et al. |
| 2013/0006759 A1 | 1/2013 | Srivastava et al. |
| 2013/0024757 A1 | 1/2013 | Doll et al. |
| 2013/0036364 A1 | 2/2013 | Johnson |
| 2013/0045753 A1 | 2/2013 | Obermeyer et al. |
| 2013/0050260 A1 | 2/2013 | Reitan |
| 2013/0055083 A1 | 2/2013 | Fino |
| 2013/0057587 A1 | 3/2013 | Leonard et al. |
| 2013/0059607 A1 | 3/2013 | Herz et al. |
| 2013/0060690 A1 | 3/2013 | Oskolkov et al. |
| 2013/0063369 A1 | 3/2013 | Malhotra et al. |
| 2013/0067027 A1 | 3/2013 | Song et al. |
| 2013/0071093 A1 | 3/2013 | Hanks et al. |
| 2013/0080254 A1 | 3/2013 | Thramann |
| 2013/0085790 A1 | 4/2013 | Palmer et al. |
| 2013/0086072 A1 | 4/2013 | Peng et al. |
| 2013/0090171 A1 | 4/2013 | Holton et al. |
| 2013/0095857 A1 | 4/2013 | Garcia et al. |
| 2013/0104053 A1 | 4/2013 | Thornton et al. |
| 2013/0110885 A1 | 5/2013 | Brundrett, III |
| 2013/0111514 A1 | 5/2013 | Slavin et al. |
| 2013/0128059 A1 | 5/2013 | Kristensson |
| 2013/0129252 A1 | 5/2013 | Lauper |
| 2013/0132477 A1 | 5/2013 | Bosworth et al. |
| 2013/0145286 A1 | 6/2013 | Feng et al. |
| 2013/0159110 A1 | 6/2013 | Rajaram et al. |
| 2013/0159919 A1 | 6/2013 | Leydon |
| 2013/0169822 A1 | 7/2013 | Zhu et al. |
| 2013/0173729 A1 | 7/2013 | Starenky et al. |
| 2013/0182133 A1 | 7/2013 | Tanabe |
| 2013/0185131 A1 | 7/2013 | Sinha et al. |
| 2013/0191198 A1 | 7/2013 | Carlson et al. |
| 2013/0194301 A1 | 8/2013 | Robbins et al. |
| 2013/0198176 A1 | 8/2013 | Kim |
| 2013/0218965 A1 | 8/2013 | Abrol et al. |
| 2013/0218968 A1 | 8/2013 | Mcevilly et al. |
| 2013/0222323 A1 | 8/2013 | Mckenzie |
| 2013/0227476 A1 | 8/2013 | Frey |
| 2013/0232194 A1 | 9/2013 | Knapp et al. |
| 2013/0263031 A1 | 10/2013 | Oshiro et al. |
| 2013/0265450 A1 | 10/2013 | Barnes, Jr. |
| 2013/0267253 A1 | 10/2013 | Case et al. |
| 2013/0275505 A1 | 10/2013 | Gauglitz et al. |
| 2013/0290443 A1 | 10/2013 | Collins et al. |
| 2013/0304646 A1 | 11/2013 | De Geer |
| 2013/0311255 A1 | 11/2013 | Cummins et al. |
| 2013/0325964 A1 | 12/2013 | Berberat |
| 2013/0344896 A1 | 12/2013 | Kirmse et al. |
| 2013/0346869 A1 | 12/2013 | Asver et al. |
| 2013/0346877 A1 | 12/2013 | Borovoy et al. |
| 2014/0006129 A1 | 1/2014 | Heath |
| 2014/0011538 A1 | 1/2014 | Mulcahy et al. |
| 2014/0019264 A1 | 1/2014 | Wachman et al. |
| 2014/0032682 A1 | 1/2014 | Prado et al. |
| 2014/0043204 A1 | 2/2014 | Basnayake et al. |
| 2014/0045530 A1 | 2/2014 | Gordon et al. |
| 2014/0047016 A1 | 2/2014 | Rao |
| 2014/0047045 A1 | 2/2014 | Baldwin et al. |
| 2014/0047335 A1 | 2/2014 | Lewis et al. |
| 2014/0049652 A1 | 2/2014 | Moon et al. |
| 2014/0052485 A1 | 2/2014 | Shidfar |
| 2014/0052633 A1 | 2/2014 | Gandhi |
| 2014/0057660 A1 | 2/2014 | Wager |
| 2014/0082651 A1 | 3/2014 | Sharifi |
| 2014/0092130 A1 | 4/2014 | Anderson et al. |
| 2014/0096029 A1 | 4/2014 | Schultz |
| 2014/0114565 A1 | 4/2014 | Aziz et al. |
| 2014/0122658 A1 | 5/2014 | Haeger et al. |
| 2014/0122787 A1 | 5/2014 | Shalvi et al. |
| 2014/0129953 A1 | 5/2014 | Spiegel |
| 2014/0143143 A1 | 5/2014 | Fasoli et al. |
| 2014/0149519 A1 | 5/2014 | Redfern et al. |
| 2014/0155102 A1 | 6/2014 | Cooper et al. |
| 2014/0173424 A1 | 6/2014 | Hogeg et al. |
| 2014/0173457 A1 | 6/2014 | Wang et al. |
| 2014/0189592 A1 | 7/2014 | Benchenaa et al. |
| 2014/0207679 A1 | 7/2014 | Cho |
| 2014/0214471 A1 | 7/2014 | Schreiner, III |
| 2014/0222564 A1 | 8/2014 | Kranendonk et al. |
| 2014/0258405 A1 | 9/2014 | Perkin |
| 2014/0265359 A1 | 9/2014 | Cheng et al. |
| 2014/0266703 A1 | 9/2014 | Dalley, Jr. et al. |
| 2014/0279061 A1 | 9/2014 | Elimeliah et al. |
| 2014/0279436 A1 | 9/2014 | Dorsey et al. |
| 2014/0279540 A1 | 9/2014 | Jackson |
| 2014/0280537 A1 | 9/2014 | Pridmore et al. |
| 2014/0282096 A1 | 9/2014 | Rubinstein et al. |
| 2014/0287779 A1 | 9/2014 | O'keefe et al. |
| 2014/0289833 A1 | 9/2014 | Briceno |
| 2014/0306986 A1 | 10/2014 | Gottesman et al. |
| 2014/0317302 A1 | 10/2014 | Naik |
| 2014/0324627 A1 | 10/2014 | Haver et al. |
| 2014/0324629 A1 | 10/2014 | Jacobs |
| 2014/0325383 A1 | 10/2014 | Brown et al. |
| 2015/0020086 A1 | 1/2015 | Chen et al. |
| 2015/0046278 A1 | 2/2015 | Pei et al. |
| 2015/0071619 A1 | 3/2015 | Brough |
| 2015/0087263 A1 | 3/2015 | Branscomb et al. |
| 2015/0088622 A1 | 3/2015 | Ganschow et al. |
| 2015/0095020 A1 | 4/2015 | Leydon |
| 2015/0096042 A1 | 4/2015 | Mizrachi |
| 2015/0116529 A1 | 4/2015 | Wu et al. |
| 2015/0169827 A1 | 6/2015 | Laborde |
| 2015/0172534 A1 | 6/2015 | Miyakawaa et al. |
| 2015/0178260 A1 | 6/2015 | Brunson |
| 2015/0222814 A1 | 8/2015 | Li et al. |
| 2015/0261917 A1 | 9/2015 | Smith |
| 2015/0312184 A1 | 10/2015 | Langholz et al. |
| 2015/0350136 A1 | 12/2015 | Flynn, III et al. |
| 2015/0365795 A1 | 12/2015 | Allen et al. |
| 2015/0378502 A1 | 12/2015 | Hu et al. |
| 2016/0006927 A1 | 1/2016 | Sehn |
| 2016/0014063 A1 | 1/2016 | Hogeg et al. |
| 2016/0085773 A1 | 3/2016 | Chang et al. |
| 2016/0085863 A1 | 3/2016 | Allen et al. |
| 2016/0099901 A1 | 4/2016 | Allen et al. |
| 2016/0180887 A1 | 6/2016 | Sehn |
| 2016/0182422 A1 | 6/2016 | Sehn et al. |
| 2016/0182875 A1 | 6/2016 | Sehn |
| 2016/0232182 A1 | 8/2016 | Harris et al. |
| 2016/0239248 A1 | 8/2016 | Sehn |
| 2016/0277419 A1 | 9/2016 | Allen et al. |
| 2016/0321708 A1 | 11/2016 | Sehn |

(56) References Cited

U.S. PATENT DOCUMENTS

| | | | |
|---|---|---|---|
| 2017/0006094 | A1 | 1/2017 | Abou Mahmoud et al. |
| 2017/0061308 | A1 | 3/2017 | Chen et al. |
| 2017/0287006 | A1 | 10/2017 | Azmoodeh et al. |
| 2018/0253901 | A1 | 9/2018 | Charlton et al. |
| 2019/0379617 | A1 | 12/2019 | Luo et al. |
| 2020/0314586 | A1 | 10/2020 | Bouba et al. |
| 2020/0382912 | A1 | 12/2020 | Dancie et al. |
| 2020/0401225 | A1 | 12/2020 | Jaureguiberry et al. |
| 2021/0011612 | A1 | 1/2021 | Dancie et al. |
| 2021/0152979 | A1 | 5/2021 | Berardino et al. |
| 2021/0266704 | A1 | 8/2021 | Dancie et al. |
| 2021/0377693 | A1 | 12/2021 | Bouba et al. |
| 2021/0406543 | A1 | 12/2021 | Drummond et al. |
| 2021/0409904 | A1 | 12/2021 | Baylin et al. |
| 2022/0174455 | A1 | 6/2022 | Guillaume |
| 2022/0269345 | A1 | 8/2022 | Jaureguiberry et al. |
| 2022/0351510 | A1 | 11/2022 | Drummond et al. |

FOREIGN PATENT DOCUMENTS

| | | | |
|---|---|---|---|
| EP | 2051480 | A1 | 4/2009 |
| EP | 2151797 | A1 | 2/2010 |
| GB | 2399928 | A | 9/2004 |
| KR | 19990073076 | A | 10/1999 |
| KR | 20010078417 | A | 8/2001 |
| WO | WO-1996024213 | A1 | 8/1996 |
| WO | WO-1999063453 | A1 | 12/1999 |
| WO | WO-2000058882 | A1 | 10/2000 |
| WO | WO-2001029642 | A1 | 4/2001 |
| WO | WO-2001050703 | A3 | 7/2001 |
| WO | WO-2006118755 | A2 | 11/2006 |
| WO | WO-2007092668 | A2 | 8/2007 |
| WO | WO-2009043020 | A2 | 4/2009 |
| WO | WO-2011040821 | A1 | 4/2011 |
| WO | WO-2011119407 | A1 | 9/2011 |
| WO | WO-2013008238 | A1 | 1/2013 |
| WO | WO-2013045753 | A1 | 4/2013 |
| WO | WO-2014006129 | A1 | 1/2014 |
| WO | WO-2014068573 | A1 | 5/2014 |
| WO | WO-2014115136 | A1 | 7/2014 |
| WO | WO-2014194262 | A2 | 12/2014 |
| WO | WO-2015192026 | A1 | 12/2015 |
| WO | WO-2016044424 | A1 | 3/2016 |
| WO | WO-2016054562 | A1 | 4/2016 |
| WO | WO-2016065131 | A1 | 4/2016 |
| WO | WO-2016100318 | A2 | 6/2016 |
| WO | WO-2016100318 | A3 | 6/2016 |
| WO | WO-2016100342 | A1 | 6/2016 |
| WO | WO-2016149594 | A1 | 9/2016 |
| WO | WO-2016179166 | A1 | 11/2016 |
| WO | 2022005838 | | 1/2022 |
| WO | WO-2022005838 | A1 | 1/2022 |

OTHER PUBLICATIONS

Bai et al., "Freeze View Touch and Finger Gesture based Interaction Methods for Handheld Augmented Reality Interfaces", 2012. (Year: 2012).*

"A Whole New Story", Snap, Inc., [Online] Retrieved from the Internet: <URL: https://www.snap.com/en-US/news/>, (2017), 13 pgs.

"Adding photos to your listing", eBay, [Online] Retrieved from the Internet: <URL: http://pages.ebay.com/help/sell/pictures.html>, (accessed May 24, 2017), 4 pgs.

"U.S. Appl. No. 17/149,428, Non Final Office Action mailed Jun. 24, 2021", 26 pgs.

"U.S. Appl. No. 17/149,428, Notice of Allowance mailed Dec. 13, 2021", 7 pgs.

"U.S. Appl. No. 17/149,428, Response filed Oct. 25, 2021 to Non Final Office Action mailed Jun. 24, 2021", 8 pgs.

"U.S. Appl. No. 17/722,917, Corrected Notice of Allowability mailed Feb. 15, 2023", 2 pgs.

"U.S. Appl. No. 17/722,917, Non Final Office Action mailed Oct. 13, 2022", 10 pgs.

"U.S. Appl. No. 17/722,917, Notice of Allowance mailed Feb. 3, 2023", 5 pgs.

"U.S. Appl. No. 17/722,917, Preliminary Amendment filed Sep. 20, 2022", 5 pgs.

"U.S. Appl. No. 17/722,917, Response filed Jan. 13, 2023 to Non Final Office Action mailed Oct. 13, 2022", 7 pgs.

"BlogStomp", StompSoftware, [Online] Retrieved from the Internet: <URL: http://stompsoftware.com/blogstomp>, (accessed May 24, 2017), 12 pgs.

"Cup Magic Starbucks Holiday Red Cups come to life with AR app", Blast Radius, [Online] Retrieved from the Internet: <URL: https://web.archive.org/web/20160711202454/http://www.blastradius.com/work/cup-magic>, (2016), 7 pgs.

"Daily App: InstaPlace (iOS/Android): Give Pictures a Sense of Place", TechPP, [Online] Retrieved from the Internet: <URL: http://techpp.com/2013/02/15/instaplace-app-review>, (2013), 13 pgs.

"Detect Common Gestures", Android, [Online] Retrieved from the Internet: <URL: https://web.archive.org/web/20180815052300/https://developer.android.com/training/gestures/detector>, (2018), 11 pgs.

"InstaPlace Photo App Tell The Whole Story", [Online] Retrieved from the Internet: <URL: youtu.be/uF_gFkg1hBM>, (Nov. 8, 2013), 113 pgs., 1:02 min.

"International Application Serial No. PCT/US2021/038650, International Search Report mailed Oct. 7, 2021", 5 pgs.

"International Application Serial No. PCT/US2021/038650, Written Opinion mailed Oct. 7, 2021", 7 pgs.

"International Application Serial No. PCT/US2015/037251, International Search Report mailed Sep. 29, 2015", 2 pgs.

"International Application Serial No. PCT/US2021/038650, International Preliminary Report on Patentability mailed Jan. 12, 2023", 9 pgs.

"Introducing Snapchat Stories", [Online] Retrieved from the Internet: <URL: https://web.archive.org/web/20131026084921/https://www.youtube.com/watch?v=88Cu3yN-LIM>, (Oct. 3, 2013), 92 pgs.; 00:47 min.

"Macy's Believe-o-Magic", [Online] Retrieved from the Internet: <URL: https://web.archive.org/web/20190422101854/https://www.youtube.com/watch?v=xvzRXy3J0Z0&feature=youtu.be>, (Nov. 7, 2011), 102 pgs.; 00:51 min.

"Macy's Introduces Augmented Reality Experience in Stores across Country as Part of Its 2011 Believe Campaign", Business Wire, [Online] Retrieved from the Internet: <URL: https://www.businesswire.com/news/home/20111102006759/en/Macys-Introduces-Augmented-Reality-Experience-Stores-Country>, (Nov. 2, 2011), 6 pgs.

"Starbucks Cup Magic", [Online] Retrieved from the Internet: <URL: https://www.youtube.com/watch?v=RWwQXi9RGOw>, (Nov. 8, 2011), 87 pgs.; 00:47 min.

"Starbucks Cup Magic for Valentine's Day", [Online] Retrieved from the Internet: <URL: https://www.youtube.com/watch?v=8nvqOzjq10w>, (Feb. 6, 2012), 88 pgs.; 00:45 min.

"Starbucks Holiday Red Cups Come to Life, Signaling the Return of the Merriest Season", Business Wire, [Online] Retrieved from the Internet: <URL: http://www.businesswire.com/news/home/20111115005744/en/2479513/Starbucks-Holiday-Red-Cups-Life-Signaling-Return>, (Nov. 15, 2011), 5 pgs.

Adamek, et al., "MobiAR: Tourist Experiences through Mobile Augmented Reality", Telefonica Research and Development, Barcelona, Spain, (2010), 7 pgs.

Cao, et al., "Single Image Augmented Reality Using Planar Structures in Urban Environments", Irish Machine Vision and Image Processing Conference, (2011), 6 pgs.

Carthy, Roi, "Dear All Photo Apps: Mobli Just Won Filters", TechCrunch, [Online] Retrieved from the Internet: <URL: https://techcrunch.com/2011/09/08/mobli-filters>, (Sep. 8, 2011), 10 pgs.

Janthong, Isaranu, "Instaplace ready on Android Google Play store", Android App Review Thailand, [Online] Retrieved from the Internet: <URL: http://www.android-free-app-review.com/2013/01/instaplace-android-google-play-store.html>, (Jan. 23, 2013), 9 pgs.

(56) References Cited

OTHER PUBLICATIONS

Macleod, Duncan, "Macys Believe-o-Magic App", [Online] Retrieved from the Internet: <URL: http://theinspirationroom.com/daily/2011/macys-believe-o-magic-app>, (Nov. 14, 2011), 10 pgs.

Macleod, Duncan, "Starbucks Cup Magic Lets Merry", [Online] Retrieved from the Internet: <URL: http://theinspirationroom.com/daily/2011/starbucks-cup-magic>, (Nov. 12, 2011), 8 pgs.

Notopoulos, Katie, "A Guide To The New Snapchat Filters And Big Fonts", [Online] Retrieved from the Internet: <URL: https://www.buzzfeed.com/katienotopoulos/a-guide-to-the-new-snapchat-filters-and-big-fonts?utm_term=.bkQ9qVZWe#.nv58YXpkV>, (Dec. 22, 2013), 13 pgs.

Panzarino, Matthew, "Snapchat Adds Filters, A Replay Function And For Whatever Reason, Time, Temperature And Speed Overlays", TechCrunch, [Online] Retrieved form the Internet: <URL: https://techcrunch.com/2013/12/20/snapchat-adds-filters-new-font-and-for-some-reason-time-temperature-and-speed-overlays/>, (Dec. 20, 2013), 12 pgs.

Tripathi, Rohit, "Watermark Images in PHP And Save File on Server", [Online] Retrieved from the Internet: <URL: http://code.rohitink.com/2012/12/28/watermark-images-in-php-and-save-file-on-server>, (Dec. 28, 2012), 4 pgs.

"European Application Serial No. 21743620.3, Response filed Jul. 25, 2023 to Communication pursuant to Rules 161(1) and 162 EPC mailed Feb. 9, 2023", 17 pgs.

\* cited by examiner

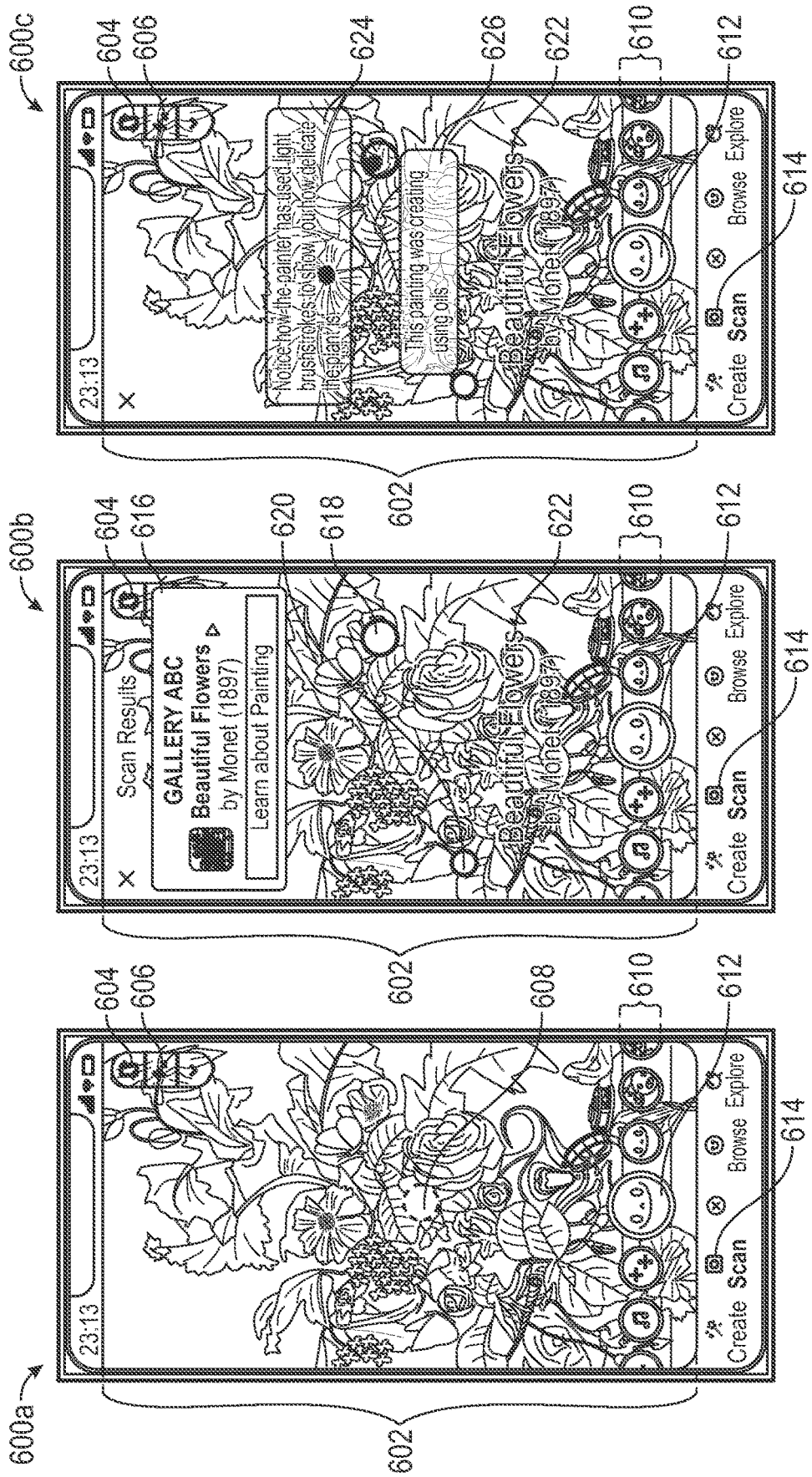

PROVIDING TRAVEL-BASED AUGMENTED REALITY CONTENT WITH A CAPTURED IMAGE

CLAIM OF PRIORITY

This application is a continuation of U.S. patent application Ser. No. 17/722,917, filed Apr. 18, 2022, which is a continuation of U.S. patent application Ser. No. 17/149,428, filed Jan. 14, 2021, which application claims the benefit of priority to U.S. Provisional Application Ser. No. 63/045,436, filed on Jun. 29, 2020, which is incorporated herein by reference in its entirety.

TECHNICAL FIELD

The present disclosure relates generally to a messaging system, including providing augmented reality content with a captured image.

BACKGROUND

Messaging systems provide for the exchange of message content between users. For example, a messaging system allows a user to exchange message content (e.g., text, images) with one or more other users.

BRIEF DESCRIPTION OF THE SEVERAL VIEWS OF THE DRAWINGS

In the drawings, which are not necessarily drawn to scale, like numerals may describe similar components in different views. To easily identify the discussion of any particular element or act, the most significant digit or digits in a reference number refer to the figure number in which that element is first introduced. Some embodiments are illustrated by way of example, and not limitation, in the figures of the accompanying drawings.

FIG. 6A illustrates an example user interface in which a user requests to display augmented reality content in association with a captured image, in accordance with some example embodiments.

FIG. 6B illustrates an example user interface for displaying augmented reality content with a captured image in association with traveling, in accordance with some example embodiments.

FIG. 6C illustrates another example user interface for displaying augmented reality content with a captured image in association with traveling, in accordance with some example embodiments.

DETAILED DESCRIPTION

A messaging system typically allow users to exchange content items (e.g., messages, images and/or video) with one another in a message thread. A messaging system may implement or otherwise work in conjunction with an augmentation system to augment media content associated with a message. For example, the augmentation system may combine overlays, filters and/or augmented reality content with image data captured by a device camera. However, a user may wish for facilitated creation and/or selection of augmented reality content when traveling.

The disclosed embodiments provide for presenting augmented reality content in association with traveling. In response to a user request to perform a scan operation (e.g., to identify objects in a captured image), a messaging client determines both attribute(s) of an object depicted in the image, and travel parameters associated with the request. For example, the travel parameters indicate travel schedules, transportation schedules, general locations, specific venues or landmarks, activities, participants and/or topics of interest.

The messaging client obtains supplemental content based on the travel parameters and on the attribute(s). The messaging client displays an augmented reality content item (e.g., corresponding to an augmented reality experience), which includes the supplemental content, together with the captured image.

Figure 1:
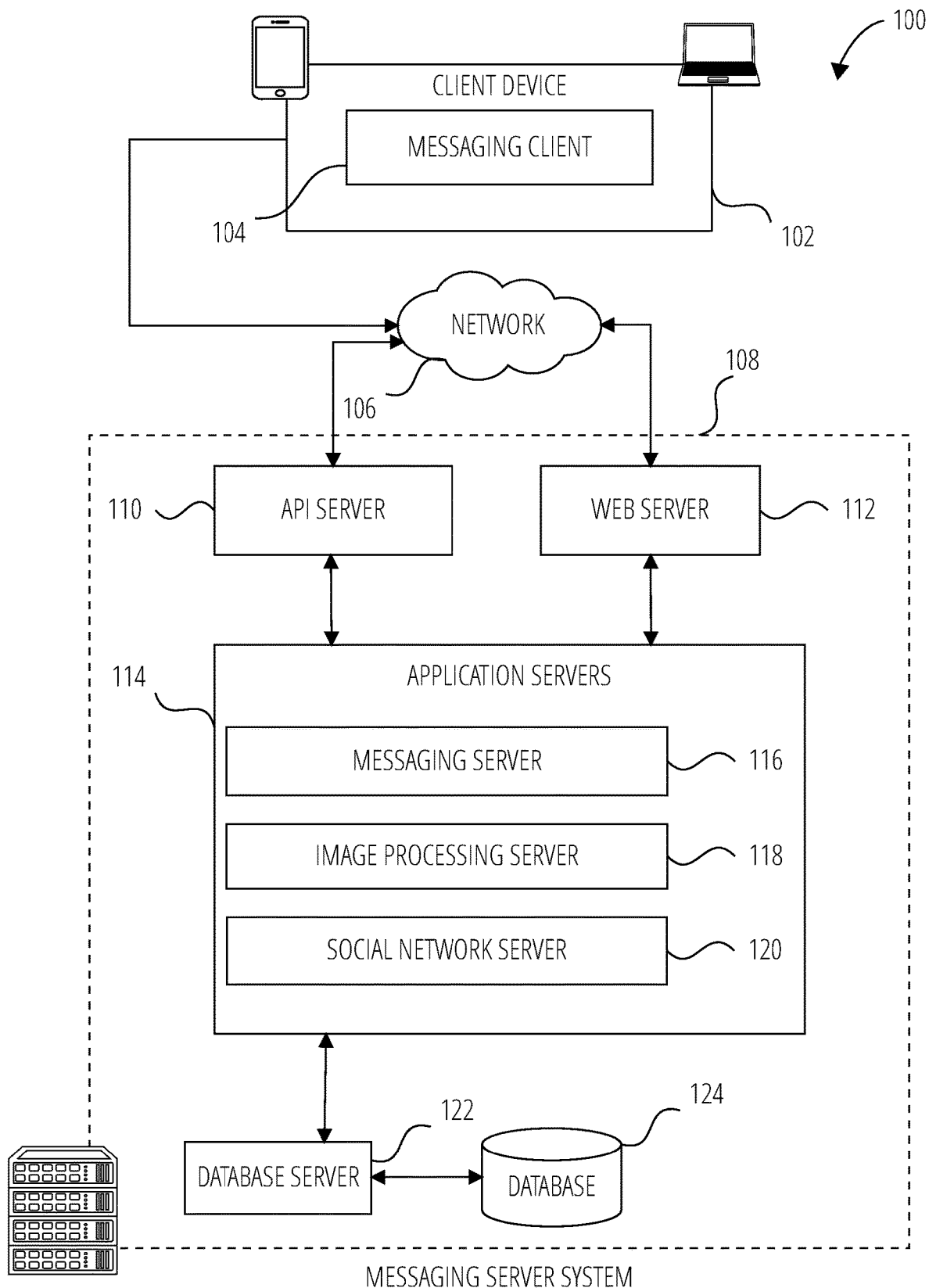
FIG. 1 is a diagrammatic representation of a networked environment in which the present disclosure may be deployed, in accordance with some example embodiments.

FIG. 1 is a block diagram showing an example messaging system 100 for exchanging data (e.g., messages and associated content) over a network. The messaging system 100 includes multiple instances of a client device 102, each of which hosts a number of applications, including a messaging client 104. Each messaging client 104 is communicatively coupled to other instances of the messaging client 104 and a messaging server system 108 via a network 106 (e.g., the Internet).

A messaging client 104 is able to communicate and exchange data with another messaging client 104 and with the messaging server system 108 via the network 106. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 106 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 110 is coupled to, and provides a programmatic interface to, application servers 114. The application servers 114 are communicatively coupled to a database server 122, which facilitates access to a database 124 that stores data associated with messages processed by the application servers 114. Similarly, a web server 112 is coupled to the application servers 114, and provides web-based interfaces to the application servers 114. To this end, the web server 112 processes incoming network requests over the Hypertext Transfer Protocol (HTTP) and several other related protocols.

The Application Program Interface (API) server 110 receives and transmits message data (e.g., commands and message payloads) between the client device 102 and the application servers 114. Specifically, the Application Program Interface (API) server 110 provides a set of interfaces (e.g., routines and protocols) that can be called or queried by the messaging client 104 in order to invoke functionality of the application servers 114. The Application Program Interface (API) server 110 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 116, and for possible access by another messaging client 104, the settings of a collection of media data (e.g., Story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 116, an image processing server 118, and a social network server 120. The messaging server 116 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called Stories or galleries). These collections are then made available to the messaging client 104. Other processor and memory intensive processing of data may also be performed server-side by the messaging server 116, in view of the hardware requirements for such processing.

The application servers 114 also include an image processing server 118 that is dedicated to performing various image processing operations, typically with respect to images or video within the payload of a message sent from or received at the messaging server 116.

Figure 3:
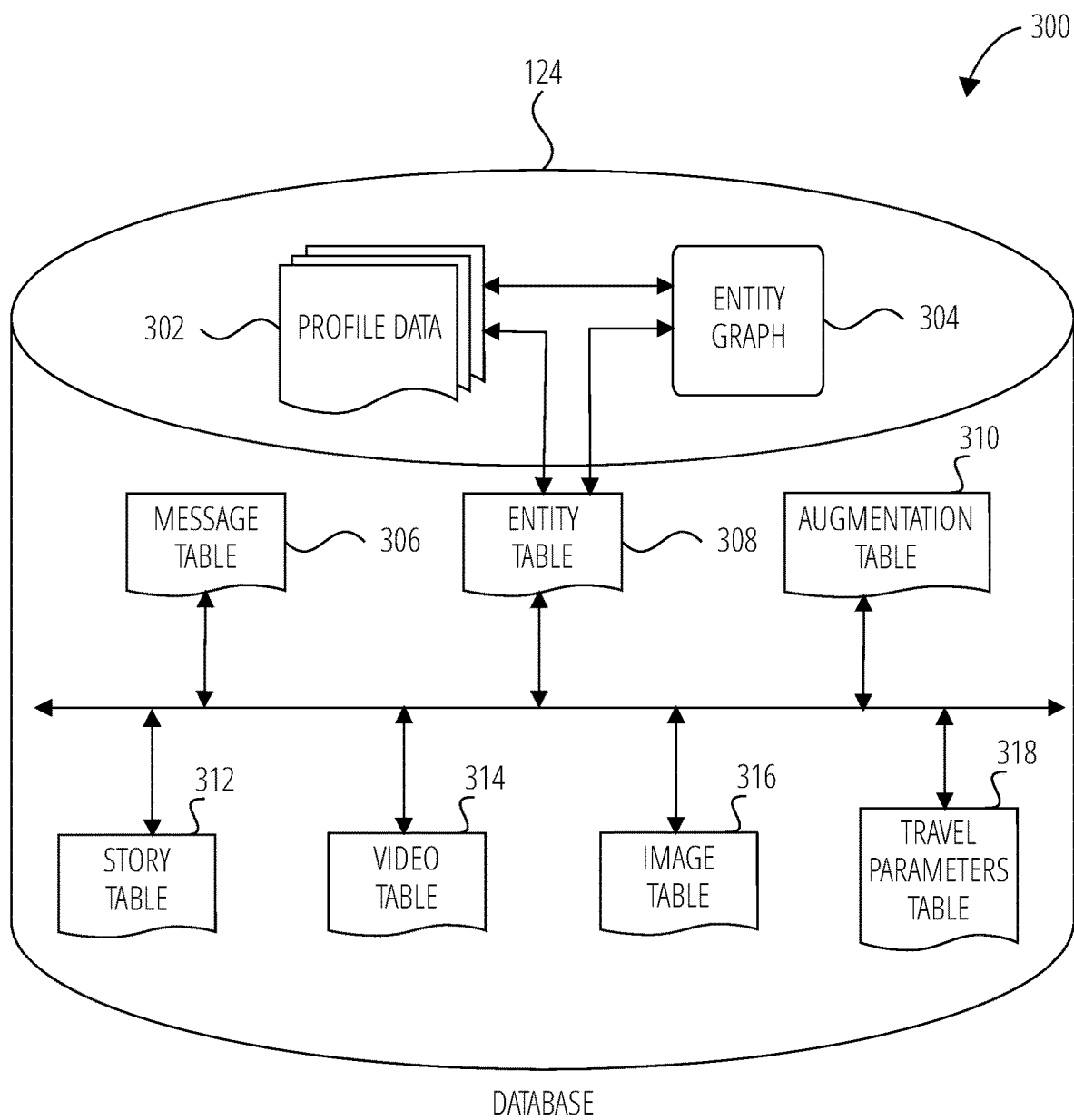
FIG. 3 is a diagrammatic representation of a data structure as maintained in a database, in accordance with some example embodiments.

The social network server 120 supports various social networking functions and services and makes these functions and services available to the messaging server 116. To this end, the social network server 120 maintains and accesses an entity graph 304 (as shown in FIG. 3) within the database 124. Examples of functions and services supported by the social network server 120 include the identification of other users of the messaging system 100 with which a particular user has relationships or is "following," and also the identification of other entities and interests of a particular user.

Figure 2:
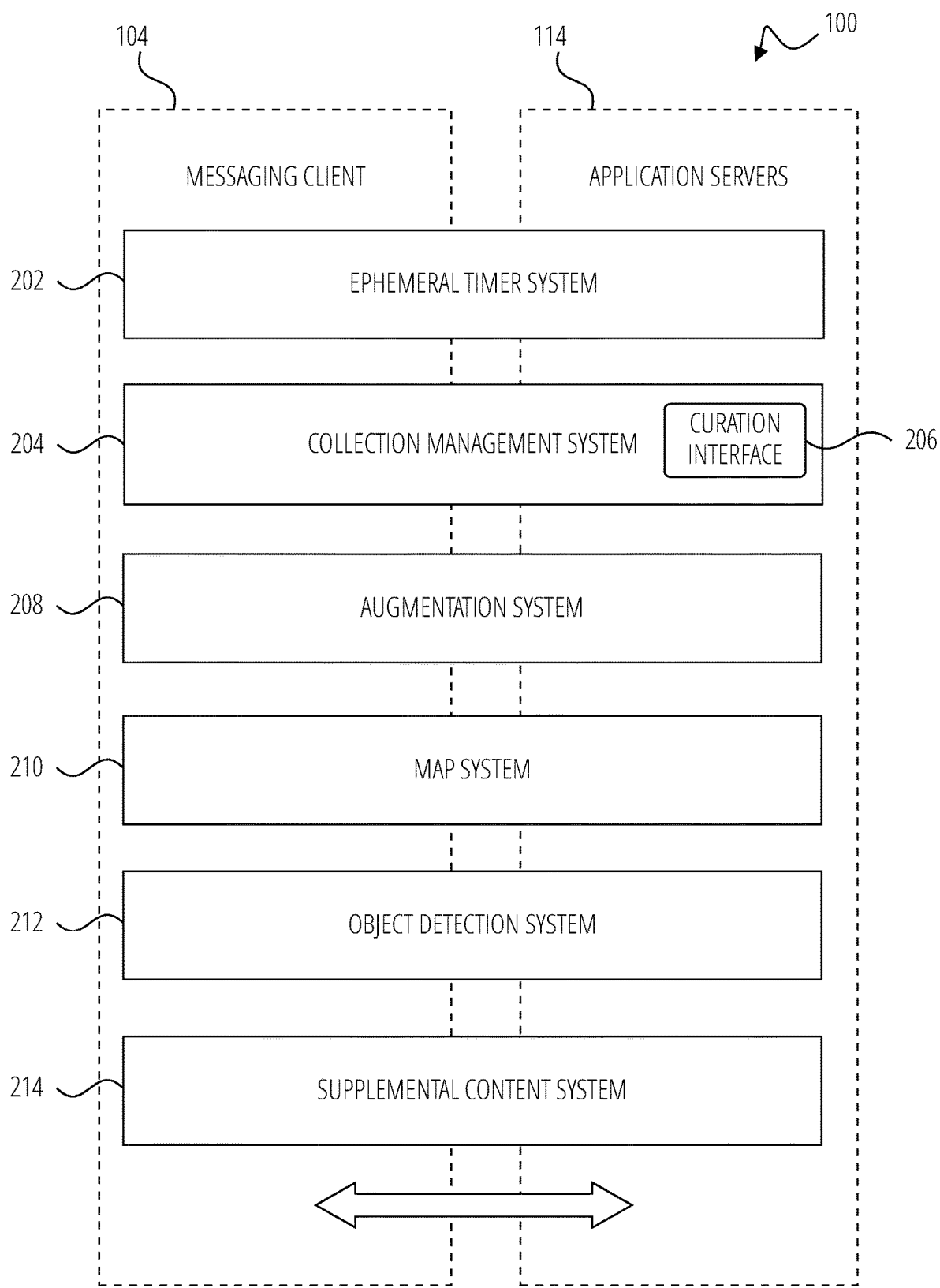
FIG. 2 is a diagrammatic representation of a messaging system that has both client-side and server-side functionality, in accordance with some example embodiments.

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client-side by the messaging client 104 and on the server-side by the application servers 114. These subsystems include, for example, an ephemeral timer system 202, a collection management system 204, an augmentation system 208, a map system 210, an object detection system 212, and/or a supplemental content system 214.

The ephemeral timer system 202 is responsible for enforcing the temporary or time-limited access to content by the messaging client 104 and the messaging server 116. The ephemeral timer system 202 incorporates a number of timers that, based on duration and display parameters associated with a message, or collection of messages (e.g., a Story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event Story." Such a collection may be made available for a specified time period, such as the duration of an event to which the content relates. For example, content relating to a music concert may be made available as a "Story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 124 and accessed through the database server 122.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time.

The map system 210 provides various geographic location functions, and supports the presentation of map-based media content and messages by the messaging client 104. For example, the map system 210 enables the display of user icons or avatars (e.g., stored in association with profile data 302, discussed below) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate avatar status, as described herein) with other users of the messaging system 100 via the messaging client 104, with this location and status information being similarly displayed within the context of a map interface of the messaging client 104 to selected users.

The object detection system 212 provides various object detection functions within the context of the messaging system 100. The object detection system 212 may employ one or more object classifiers to identify objects depicted in a captured image. The image may correspond to a live video feed captured by a camera (e.g., rear or front facing camera) of the client device 102. Alternatively or in addition, the image may correspond to an image (e.g., photo) stored in association with the user of the client device 102 (e.g., a photo library).

In one or more embodiments, the object detection system 212 is configured to implement or otherwise access object recognition algorithms (e.g., including machine learning algorithms) configured to scan the captured image, and to detect/track the movement of objects within the image. By way of non-limiting example, detectable objects within an image include: a human face, parts of a human body, animals and parts thereof, landscapes, objects in nature, non-living objects (e.g., food, articles of clothing, chairs, books, cars, buildings, other structures), illustrations of objects (e.g., on posters and/or flyers), text-based objects, equation-based objects and the like.

In addition, the object detection system 212 is configured to determine or otherwise access attributes of objects. For a particular object, the object detection system 212 may determine or retrieve attributes such as a name/type, genre, color, size, shape, texture, environmental factors (e.g., geolocation, time, weather), and/or other supplemental information (e.g., a song title/artist for an object corresponding to media).

With respect to the environmental factors, the object detection system 212 may receive information from the messaging client 104 to identify the weather, geographical location, time, and so forth around the client device 102 (e.g., via device sensors). The object detection system 212 may rank the retrieved attributes based on relevance, such as based on their association with the one or more environmental factors. Other machine learning techniques may be employed to select and rank retrieved attributes. The object detection system 212 may select an object from the list of objects detected in the captured image that is associated with the highest ranked attributes, and may send an indication of the selected object to the messaging client 104. Alternatively or in addition, the object detection system 212 may provide for communicating one or more attributes (e.g., name/type) for each detected object, and/or an indication of the ranking of the attributes to the messaging client 104.

In one or more embodiments, the object detection system 212 determines that one of the attributes corresponds to a keyword that has been sponsored by a third party. For example, third parties may sponsor or pay for certain keywords to be ranked higher than others. In response to determining that a given attribute corresponds to a sponsored keyword, the object detection system 212 may provide for a higher ranking of that attribute relative to other attributes.

The supplemental content system 214 provides various functions for obtaining supplemental content that relates to objects, for example, based on search parameters for the objects. For example, the search parameters may correspond to attribute(s) of the objects as provided by the object detection system 212. In one or more embodiments, the supplemental content system 214 is configured to query third-party services (e.g., third-party databases) using the search parameters. In response, the third-party services provides supplemental content that relates to a particular object. For example, the third-party services may provide supplemental content in the form of general information, expert commentary and/or user-submitted reviews with respect to art, literature, events, games, businesses, venues, locations, products, professional services and the like. Alternatively or in addition, the supplemental content system 214 is configured to query the database 124 for supplemental content (e.g., general information, comments submitted by users of the messaging system 100) using the search parameters.

FIG. 3 is a schematic diagram illustrating data structures 300, which may be stored in the database 124 of the messaging server system 108, according to certain examples. While the content of the database 124 is shown to comprise a number of tables, it will be appreciated that the data could be stored in other types of data structures (e.g., as an object-oriented database).

The database 124 includes message data stored within a message table 306. This message data includes, for any particular one message, at least message sender data, message recipient (or receiver) data, and a payload. Further details regarding information that may be included in a message, and included within the message data stored in the message table 306 is described below with reference to FIG. 4.

An entity table 308 stores entity data, and is linked (e.g., referentially) to an entity graph 304 and profile data 302. Entities for which records are maintained within the entity table 308 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 304 stores information regarding relationships and associations between entities. Such relationships may be social, professional (e.g., work at a common corporation or organization) interest-based or activity-based, merely for example.

The profile data 302 stores multiple types of profile data about a particular entity. The profile data 302 may be selectively used and presented to other users of the messaging system 100, based on privacy settings specified by a particular entity. Where the entity is an individual, the profile data 302 includes, for example, a user name, telephone number, address, settings (e.g., notification and privacy settings), as well as a user-selected avatar representation (or collection of such avatar representations), if any. A particular user may then selectively include one or more of these avatar representations within the content of messages communicated via the messaging system 100, and on map interfaces displayed by messaging clients 104 to other users.

Where the entity is a group, the profile data 302 for the group may similarly include one or more avatar representations associated with the group, in addition to the group name, members, and various settings (e.g., notifications) for the relevant group.

The database 124 further includes a travel parameters table 318 for storing respective travel parameters for users. While the travel parameters table 318 is depicted as separate from the profile data 302, it is possible for the travel parameters table 318 to be included as part of the profile data 302. Thus, each entity/user may have respective travel parameters associated therewith. Examples of travel parameters include, but are not limited to: travel schedules, transportation schedules, general locations, specific venues or landmarks, activities, participants (e.g., friends who are participating in all or part of the traveling) and/or topics of interest.

The messaging system 100 may populate the travel parameters table 318 based on user-submitted content provided within the messaging client 104 (e.g., content within message threads, and/or in association with travel-planning user interfaces provided by the messaging system 100). Alternatively or in addition, the messaging system 100 may populate the database 124 based on content from third-party applications (e.g., content from third-party email/text message applications, calendar applications, flight applications, hotel applications, etc.). In one or more embodiments, a user may opt-in and/or otherwise authorize populating the travel parameters table 318 with content from within the messaging system 100 and/or from third-party applications.

The database 124 also stores augmentation data, such as overlays or filters, in an augmentation table 310. The augmentation data is associated with and applied to videos (for which data is stored in a video table 314) and images (for which data is stored in an image table 316).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 316 includes augmented reality content items (e.g., corresponding to applying Lenses or augmented reality experiences). An augmented reality content item may be a real-time special effect and sound that may be added to an image or a video.

As described above, augmentation data includes augmented reality content items, overlays, image transformations, AR images, and similar terms refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudorandom animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various embodiments, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements characteristic points for each element of an object are calculated (e.g., using an Active Shape Model (ASM) or other known methods). Then, a mesh based on the characteristic points is generated for each of the at least one element of the object. This mesh used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various embodiments, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

In other examples, other methods and algorithms suitable for face detection can be used. For example, in some embodiments, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on the client device 102 and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transform system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine taught neural networks may be used to enable such modifications.

The graphical user interface, presenting the modification performed by the transform system, may supply the user with additional interaction options. Such options may be based on the interface used to initiate the content capture and selection of a particular computer animation model (e.g., initiation from a content creator user interface). In various embodiments, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some embodiments, individual faces, among a group of multiple faces, may be individually modified, or such modifications may be individually toggled by tapping or selecting the individual face or a series of individual faces displayed within the graphical user interface.

A story table 312 stores data regarding collections of messages and associated image, video, or audio data, which are compiled into a collection (e.g., a Story or a gallery). The creation of a particular collection may be initiated by a particular user (e.g., each user for which a record is maintained in the entity table 308). A user may create a "personal Story" in the form of a collection of content that has been created and sent/broadcast by that user. To this end, the user interface of the messaging client 104 may include an icon that is user-selectable to enable a sending user to add specific content to his or her personal Story.

A collection may also constitute a "live Story," which is a collection of content from multiple users that is created manually, automatically, or using a combination of manual and automatic techniques. For example, a "live Story" may constitute a curated stream of user-submitted content from varies locations and events. Users whose client devices have location services enabled and are at a common location event at a particular time may, for example, be presented with an option, via a user interface of the messaging client 104, to contribute content to a particular live Story. The live Story may be identified to the user by the messaging client 104, based on his or her location. The end result is a "live Story" told from a community perspective.

A further type of content collection is known as a "location Story," which enables a user whose client device 102 is located within a specific geographic location (e.g., on a college or university campus) to contribute to a particular collection. In some examples, a contribution to a location Story may require a second degree of authentication to verify that the end user belongs to a specific organization or other entity (e.g., is a student on the university campus).

As mentioned above, the video table 314 stores video data that, in one example, is associated with messages for which records are maintained within the message table 306. Similarly, the image table 316 stores image data associated with messages for which message data is stored in the entity table 308. The entity table 308 may associate various augmentations from the augmentation table 310 with various images and videos stored in the image table 316 and the video table 314.

Figure 4:
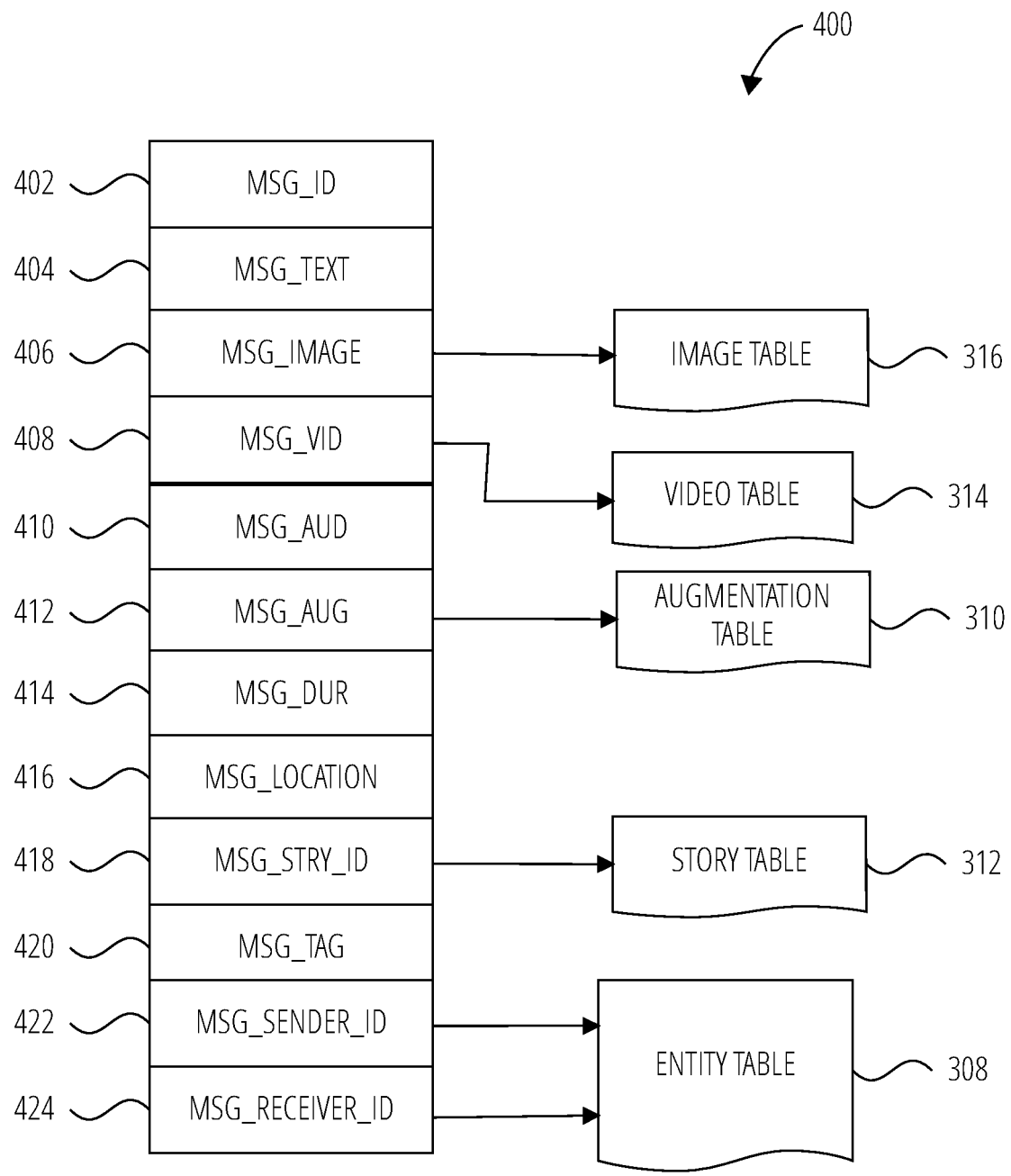
FIG. 4 is a diagrammatic representation of a message, in accordance with some example embodiments.

FIG. 4 is a schematic diagram illustrating a structure of a message 400, according to some examples, generated by a messaging client 104 for communication to a further messaging client 104 or the messaging server 116. The content of a particular message 400 is used to populate the message table 306 stored within the database 124, accessible by the messaging server 116. Similarly, the content of a message 400 is stored in memory as "in-transit" or "in-flight" data of the client device 102 or the application servers 114. A message 400 is shown to include the following example components:

message identifier 402: a unique identifier that identifies the message 400.

message text payload 404: text, to be generated by a user via a user interface of the client device 102, and that is included in the message 400.

message image payload 406: image data, captured by a camera component of a client device 102 or retrieved from a memory component of a client device 102, and that is included in the message 400. Image data for a sent or received message 400 may be stored in the image table 316.

message video payload 408: video data, captured by a camera component or retrieved from a memory component of the client device 102, and that is included in the message 400. Video data for a sent or received message 400 may be stored in the video table 314.

message audio payload 410: audio data, captured by a microphone or retrieved from a memory component of the client device 102, and that is included in the message 400.

message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.

message duration parameter 414: parameter value indicating, in seconds, the amount of time for which content of the message (e.g., the message image payload 406, message video payload 408, message audio payload 410) is to be presented or made accessible to a user via the messaging client 104.

message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image into within the message image payload 406, or a specific video in the message video payload 408).

message story identifier 418: identifier values identifying one or more content collections (e.g., "Stories" identified in the story table 312) with which a particular content item in the message image payload 406 of the message 400 is associated. For example, multiple images within the message image payload 406 may each be associated with multiple content collections using identifier values.

message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the Client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 316. Similarly, values within the message video payload 408 may point to data stored within a video table 314, values stored within the message augmentations 412 may point to data stored in an augmentation table 310, values stored within the message story identifier 418 may point to data stored in a story table 312, and values stored within the message sender identifier 422 and the message receiver identifier 424 may point to user records stored within an entity table 308.

Figure 5:
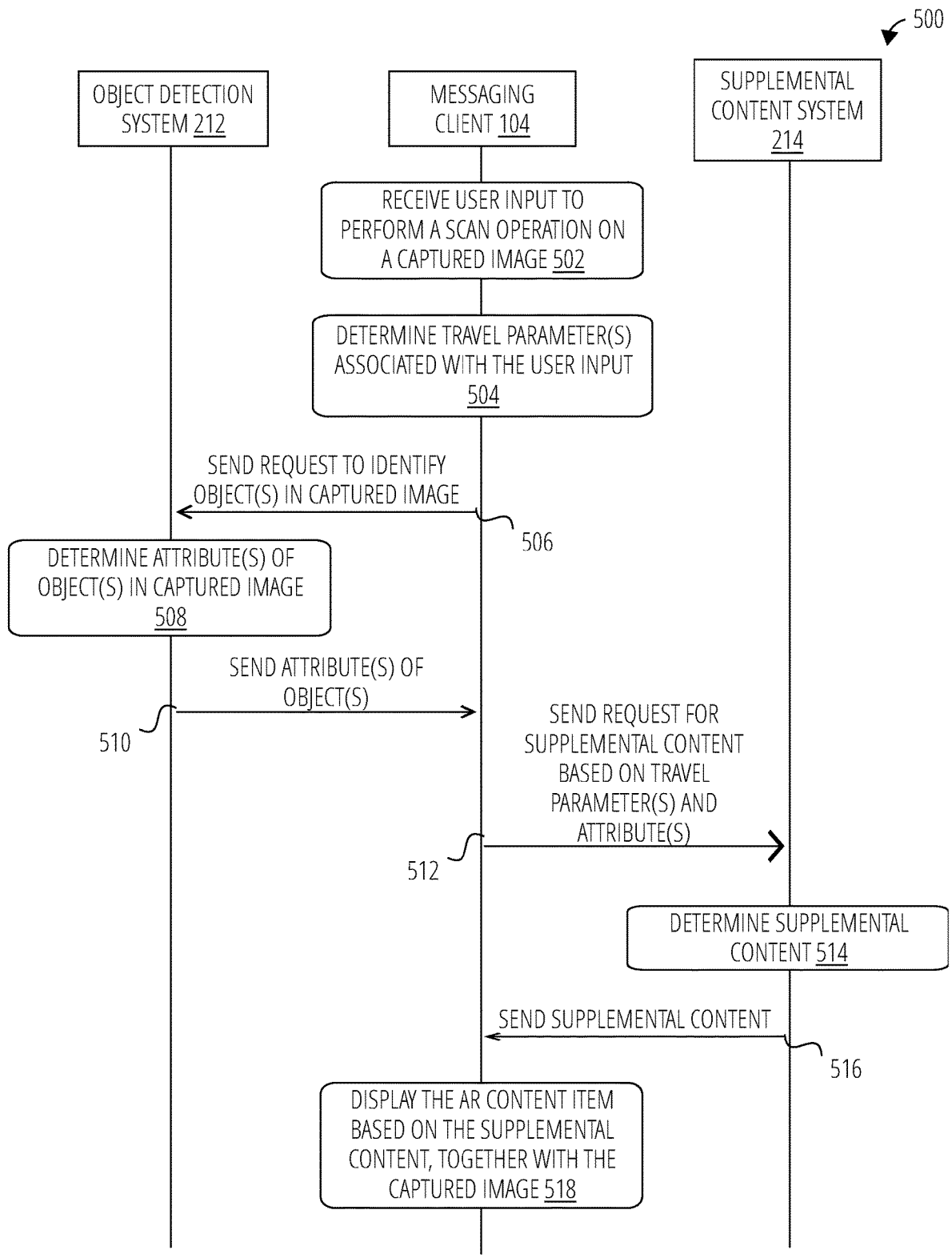
FIG. 5 is an interaction diagram illustrating a process for providing augmented reality content with a captured image in association with traveling, in accordance with some example embodiments.

FIG. 5 is an interaction diagram illustrating a process 500 for providing augmented reality content with a captured image in association with traveling, in accordance with some example embodiments. For explanatory purposes, the process 500 is primarily described herein with reference to the messaging client 104 of FIG. 1, and the object detection system 212 and the supplemental content system 214 of FIG. 2. However, one or more blocks (or operations) of the process 500 may be performed by one or more other components, and/or by other suitable devices. Further for explanatory purposes, the blocks (or operations) of the process 500 are described herein as occurring in serial, or linearly. However, multiple blocks (or operations) of the process 500 may occur in parallel or concurrently. In addition, the blocks (or operations) of the process 500 need not be performed in the order shown and/or one or more blocks (or operations) of the process 500 need not be performed and/or can be replaced by other operations. The process 500 may be terminated when its operations are completed. In addition, the process 500 may correspond to a method, a procedure, an algorithm, etc.

The messaging client 104 may be associated with a respective user of the messaging server system 108, and the user may be associated with a user account of the messaging server system 108. As noted above, the user may be identified by the messaging server system 108 based on a unique identifier (e.g., a messaging system identifier, email address and/or a device identifier) associated with the user account for that user. In addition, the messaging server system 108 may implement and/or work in conjunction with the social network server 120 which is configured to identify other users (e.g., friends) with which a particular user has relationships.

As described herein, the messaging client 104 (e.g., in conjunction with the messaging server system 108) receives a user request to perform a scan operation on a captured image (e.g., a live video feed, or a photo/video selected from a photo library). The messaging client 104 determines travel parameters (e.g., travel schedules, transportation schedules, general locations, specific venues or landmarks, activities, participants and/or topics of interest) associated with the request. The messaging client 104 also determines attribute(s) of an object depicted in the captured image. The messaging client 104 obtains supplemental content based on the travel parameters and the attribute(s). The messaging client 104 displays an augmented reality content item (e.g., corresponding to an augmented reality experience), which includes the supplemental content, together with the captured image.

At block 502, the messaging client 104 receives user input to perform a scan operation on a captured image. As described herein, performing a scan operation corresponds with identifying objects depicted in the captured image. In one or more embodiments, the messaging client 104 activates the camera of the client device 102 (e.g., upon startup of the messaging client 104). The messaging client 104 allows a user to request to scan one or more items in a camera feed captured by the camera. In one or more embodiments, the messaging client 104 detects physical contact between a finger of the user's hand and a region of the touch screen for a threshold period of time (e.g., corresponding to a press-and-hold gesture). For example, the messaging client 104 determines that the user touched and held their finger on the screen for a threshold time (e.g., two seconds).

In an alternative embodiment, the press-and-hold gesture may be performed in association with a carousel interface (e.g., which is separate from a startup interface, as discussed below with respect to FIGS. 6A-6C). Within the carousel interface, an augmented reality content item, for modifying a captured image to include augmented reality content, may already be selected prior to receiving the user input. With respect to the press-and-hold gesture, the augmented reality content item may in some embodiments include a scan prompt which prompts the user for input to perform the scan operation. For example, the scan prompt may include text (e.g., "press and hold to scan") prompting the user for the press-and-hold gesture within a graphical boundary defining a predefined screen region.

As an alternative to the press-and-hold gesture, the messaging client 104 may receive user selection of a dedicated scan option (e.g., a scan button) presented together with the camera feed. Thus, in response to a user request to perform a scan operation, the messaging client 104 processes the captured image (e.g., a live video feed) to identify object(s) in the image. It is also possible for the captured image to correspond with an image/video stored in association with the user of the client device 102, for example, within a photo library (e.g., associated with an operating system of the client device 102 and/or associated with a user profile with respect to the messaging system 100).

At block 504, the messaging client 104 determines a travel parameter associated with the user input. As noted above with respect to the travel parameters table 318, the messaging client 104 in conjunction with the messaging system 100 may be configured to access (e.g., based on appropriate user permissions) data relating to travel by the user, and to populate the travel parameters table 318 accordingly. The travel parameters table 318 may store travel parameters corresponding to user-submitted content provided within the messaging client 104 (e.g., content within message threads, and/or in association with travel-planning user interfaces provided by the messaging system 100). In another example, the travel parameters table 318 may store travel parameters corresponding to content from third-party applications (e.g., content from email/text messages, a calendar application, a flight application, a hotel application). In one or more embodiments, the travel parameters indicate one or more of: travel schedule(s), transportation schedule(s), general location(s) (e.g., cities, states, etc.), specific venues or landmarks, activities, participants (e.g., friends) and/or topics of interest.

Moreover at operation 506, the messaging client 104 sends, to the object detection system 212, a request to identify objects in the captured image (operation 506). The request may include the image data itself (e.g., if being captured in real time and/or stored locally on the client device 102). Alternatively, the request may reference a remote image (e.g., if stored in association with a user profile with respect to the messaging system 100).

In response to the request, the object detection system 212 determines attribute(s) of object(s) in the captured image (block 508). As noted above, the object detection system 212 may correspond to a subsystem of the messaging system 100, and may be supported on the client side by the messaging client 104 and/or on the server side by the application servers 114. In one or more embodiments, the detection of object(s) within a captured image may be implemented client side, server side and/or a combination of client side and server side.

As further noted above, the object detection system 212 is configured to implement or otherwise access object recognition algorithms (e.g., including machine learning algorithms) configured to scan a captured image, and to detect/track the movement of objects within the image. For example, the object detection system 212 may detect object(s) in the captured image that relate to travel (e.g., a landmark, a piece of art, a product for sale at a particular venue, etc.). In another example, the object detection system 212 may detect an object in the image corresponding to a barcode (e.g., a Universal Product Code (UPC) code, QR code, or the like). In yet another example, the object detection system 212 may detect a combination of object(s) and/or barcode(s), depicted in the captured image (e.g., relating to travel).

The object detection system 212 is further configured to determine or otherwise access attributes of the identified objects. For example, with respect to objects associated with user travel, the object detection system 212 may determine attributes such as a name of the object (e.g., a name of a venue, piece of art, landmark and the like), and other general information (e.g., physical attributes, associated dates, authors, etc.). As noted above, the object detection system 212 may determine attribute(s) corresponding to a keyword that has been sponsored by a third party. For example, a third party (e.g., associated with a museum, venue or other business) may sponsor or pay for certain keywords (e.g., names of art pieces) to be ranked higher than others. In response to determining that a given attribute corresponds to a sponsored keyword, the object detection system 212 may provide for a higher ranking of that attribute relative to other attributes.

The object detection system 212 sends, to the messaging client 104, the attribute(s) of the object(s) to the messaging client 104 (operation 510). In doing so, the object detection system 212 may further provide ranking information of the attribute(s). In one or more embodiments, the messaging client 104 determines that the attribute(s) of the object (e.g., object name, venue) and environmental factors (e.g., device geolocation and time) correspond with one or more of the travel parameters. For example, such correspondence may be based on matching (e.g., meeting a threshold comparison value with respect to) time periods, locations, topics and/or activities of the object attribute(s)/environmental factors with those of the travel parameters. The messaging client 104 then sends, to the supplemental content system 214, a request for supplemental content (operation 512). The request includes the attribute(s) (e.g., with ranking information) and the travel parameter(s). The request may further include device geolocation and/or other environmental factors (e.g., time).

The supplemental content system 214 determines supplemental content based on the attribute(s), travel parameter(s), and/or environmental factors (block 514). As noted above, the supplemental content system 214 may correspond to a subsystem of the messaging system 100, and may be supported on the client side by the messaging client 104 and/or on the server side by the application servers 114. In one or more embodiments, the selection of supplemental based on attribute(s), travel parameter(s) and/or environmental factors via the supplemental content system 214 may be implemented client side, server side and/or a combination of client side and server side.

As noted above, the supplemental content system 214 is configured to obtain supplemental content for objects (e.g., art, venues, landmarks, etc.) based on search parameters (e.g., the provided attribute(s), travel parameter(s) and/or geolocation). The supplemental content system 214 may obtain the supplemental content by querying third-party services (e.g., third-party databases) using the search parameters. Alternatively or in addition, the supplemental content system 214 may obtain the supplemental content by querying the database 124 using the search parameters. In one or more embodiments, the supplemental content may correspond to general information, expert commentary and/or user-submitted reviews with respect to art, literature, events, games, businesses, venues, locations, products, professional services and the like.

The supplemental content system 214 may calculate respective relevancy scores for supplemental content, for example, based on a number or frequency of confirmed matches between matching search parameters. The relevancy scores may be used for limiting a number of supplemental content item(s) that are selected and/or for displaying the selected supplemental content item(s) in ranked order. At operation 516, the supplemental content system 214 sends the supplemental content to the messaging client 104, together with relevancy scores, if applicable.

As noted above with respect to block 502, the user input to perform the scan operation may have been received within a carousel interface, with an augmented reality content item already having been selected. Alternatively, the user input may have been received upon startup of the messaging client 104 (e.g., within a startup interface), in which case an augmented reality content item had not yet been selected.

In a case where an augmented reality content item had not been selected, the augmentation system 208 may provide for selecting an augmented reality content item, which in turn corresponds with selection of the supplemental content. In one or more embodiments, the supplemental content system 214 may correspond to a subsystem of the augmentation system 208. Thus, while the example of FIG. 5 depicts operations 512-516 as occurring between the messaging client 104 and the supplemental content system 214, it is possible that these operations are performed (at least in part) between the messaging client 104 and the augmentation system 208. For example, the augmentation system 208 may be configured to communicate with appropriate third-party services for supplemental content. Alternatively or in addition, the supplemental content system 214 may be a system which is separate from the augmentation system 208. For example, the messaging client 104 and/or the augmentation system 208 may communicate with the supplemental content system 214 to obtain supplemental content.

In one or more embodiments, the supplemental content obtained at block 514 and sent at operation 516 may correspond to a data structure with the supplemental information. The data structure may be usable by a given augmented reality content item to generate augmented reality content which includes the supplemental content. In this manner, the augmented reality content item may correspond to a template with placeholders for the supplemental content.

Alternatively or in addition, the supplemental content obtained at block 514 and sent at operation 516 may itself correspond to the augmented reality content item, which is selected among plural augmented reality content items stored in the augmentation table 310. In this manner, the augmented reality content item may have the supplemental content integrated therein.

Following operation 516, the messaging client 104 displays the augmented reality content item based on the received supplemental content (and/or relevancy scores), together with the captured image (block 518). As discussed with respect to FIGS. 6A-6C and 7A-7B below, the augmented reality content item may be configured to modify the captured image with augmented reality content (e.g., overlays, visual effects, and the like) that includes the supplemental content provided by the supplemental content system 214.

In one or more implementations, the augmented reality content item may correspond with a "face in picture" feature, corresponding to an augmented reality experience where portions of user's face is overlaid on a painting (e.g., where the user's eyes and mouth appear to replace eyes and mouth region of the painting). The supplemental content may define the region(s) of the painting to be replaced, in real-time, with a live video feed. The defined regions may correspond to parts of a user's face, body, or combinations thereof.

In one or more implementations, the augmented reality content item may provide audio commentary with respect to detected objects (e.g., a piece of art, landmark). The supplemental content may include pre-recorded audio file(s) for presenting with captured image data (e.g., in response to user selection of a predefined region of the depicted image). Alternatively or in addition, the audio commentary may be based on text included with the supplemental content and labeled (e.g., with metadata) for outputting in audio. The messaging client 104, in conjunction with the augmented reality content item, may provide for converting the labeled text to audio for output.

Thus, the messaging client 104, in conjunction with the messaging server system 108, provides for providing augmented reality content with a captured image. The selection of the augmented reality content and associated supplemental content is based on attribute(s) of objects detected in the image, as well as travel parameters associated with an account of the user.

FIG. 6A illustrates an example user interface 600a in which a user requests to display augmented reality content in association with a captured image, in accordance with some example embodiments. The user interface 600a includes a captured image 602, a camera selection button 604, a flash button 606, a carousel interface 610, a selected AR icon 612 and a scan button 614.

In one or more embodiments, a user of the client device 102 may have provided touch input 608 to the messaging client 104, to perform a scan operation to identify objects in the captured image 602 (e.g., a live video feed from a rear-facing camera). For example, the touch input corresponds to a press-and-hold gesture (e.g., of at least one second) at a predefined portion of the device screen, or user selection of a dedicated button (e.g., the scan button 614). In an alternative embodiment, the user may have selected an interface element (e.g., an image selection button) to perform a scan on a photo/video selected from a photo library (e.g., stored locally on the client device 102 or stored remotely in association with a user account of the messaging system 100). As shown in FIG. 6A, the captured image 602 depicts a painting.

In one or more embodiments, during the scan operation, the messaging client 104 is configured to display a scanning graphic (not shown) to indicate that the messaging client 104 is performing the scan operation. For example, the scanning graphic corresponds to an animation that is displayed for the duration of the scan (e.g., a predetermined duration of 2 seconds).

In response to receiving the touch input, the messaging client 104 (e.g., in conjunction with the object detection system 212) is configured to detect objects in the captured image 602, as well as attribute(s) of the detected objects. For example, the object detection system 212 detects attribute(s) associated with the depicted painting (e.g., a name the painting, a time period associated with the painting).

In addition, the messaging client 104 determines travel parameters associated with the touch input (e.g., one or more of a travel schedule, a transportation schedule, a general location, a specific venue or landmark, an activity, a list of participants, or a topic of interest). In one or more embodiments, the messaging client 104 determines that the name of the painting and environmental factors (e.g., device geolocation and time) correspond with one or more of the travel parameters. In response, the messaging client 104 (in conjunction with the supplemental content system 214 and/or the augmentation system 208) is configured to determine supplemental content for presenting in association with an augmented reality content item, as discussed below with respect to FIGS. 6B-6C.

In one or more embodiments, the user interface 600a includes the camera selection button 604 for switching between the rear-facing and front-facing camera of the client device 102. In addition, the user interface 600a includes the flash button 606 for activating or deactivating a flash with respect to the captured image 602.

In one or more embodiments, the user interface 600a includes the carousel interface 610 which allows the user to cycle through and/or select different augmented reality content items to apply/display with respect to the captured image 602. Each of the available augmented reality content items is represented by an icon which is user-selectable for switching to the respective augmented reality content item. In one or more embodiments, the icon corresponding to an active augmented reality content item (e.g., a selected AR icon 612) is displayed in a different manner relative to (e.g., larger than) the remaining icons. In response to user selection of the selected AR icon 612, the messaging client 104 provides for generating a media content item which includes an image (e.g., in response to a press/tap gesture of the selected AR icon 612) and/or a video (e.g., in response to a press-and-hold gesture of the selected AR icon 612) of the screen content, for example, to send to friends, include in a Story, and the like.

FIG. 6B illustrates an example user interface 600b for displaying augmented reality content with a captured image in association with traveling, in accordance with some example embodiments. The user interface 600b depicts the captured image 602, the camera selection button 604, the carousel interface 610, the selected AR icon 612 and the scan button 614 of FIG. 6A. Moreover, the user interface 600b includes a supplemental content card 616 and supplemental information 622.

In the example of FIG. 6B, the user interface 600b presents supplemental content in the form of a supplemental content card 616 and supplemental information 622. The supplemental content card 616 and the supplemental information 622 may be presented in association with augmented reality content provided via selection of the selected AR icon 612.

In one or more embodiments, the supplemental information 622 may correspond to an overlay with text (e.g., the name, author and date of the detected painting). In addition, the supplemental content card 616 is presented as an overlay with a brief description (e.g., the name, author and date) of the detected painting. The supplemental content card 616 further includes a user-selectable link for redirecting to an interface with further information regarding the detected painting. While the supplemental content card 616 depicts a link for redirecting to additional information, it is possible for the link to instead correspond to one or more of an invitation to a group/event chat, an invitation to a private Story, a request, commerce, an attachment, a game, a user profile, music, an augmented reality content item, a venue page, a sponsored attachment, and/or a third-party application associated with the detected painting.

The augmented reality content item corresponding to the selected AR icon 612 may also provide augmented reality content in response to touch input 618 and touch input 620. For example, the touch input 618 and touch input 620 may be associated with different parts of the device screen corresponding to different predefined regions of the detected painting. The augmented reality content item may provide for display of respective augmented reality content (including supplemental content) based on the touch input 618 and the touch input 620, as discussed below with respect to FIG. 6C.

FIG. 6C illustrates another example user interface 600c for displaying augmented reality content with a captured image in association with traveling, in accordance with some example embodiments. The user interface 600b depicts the captured image 602, the camera selection button 604, the flash button 606, the carousel interface 610, the selected AR icon 612, the scan button 614, and the supplemental information 622 of FIGS. 6A-6B. Moreover, the user interface 600b includes supplemental content 624 and supplemental content 626.

For example, the supplemental content 624 corresponds to supplemental content provided by the supplemental content system 214 based on the above-noted object attribute(s), travel parameter(s) and/or environmental factors. In one or more embodiments, the supplemental content 624 is associated (e.g., based on metadata provided by the supplemental content system 214) with a predefined area of the detected painting that corresponds to the touch input 618, and is displayed in response to such touch input 618. In a similar manner, the supplemental content 626 is associated with a predefined area of the detected painting that corresponds to the touch input 620, and is displayed in response to such touch input 620.

Figure 7B:
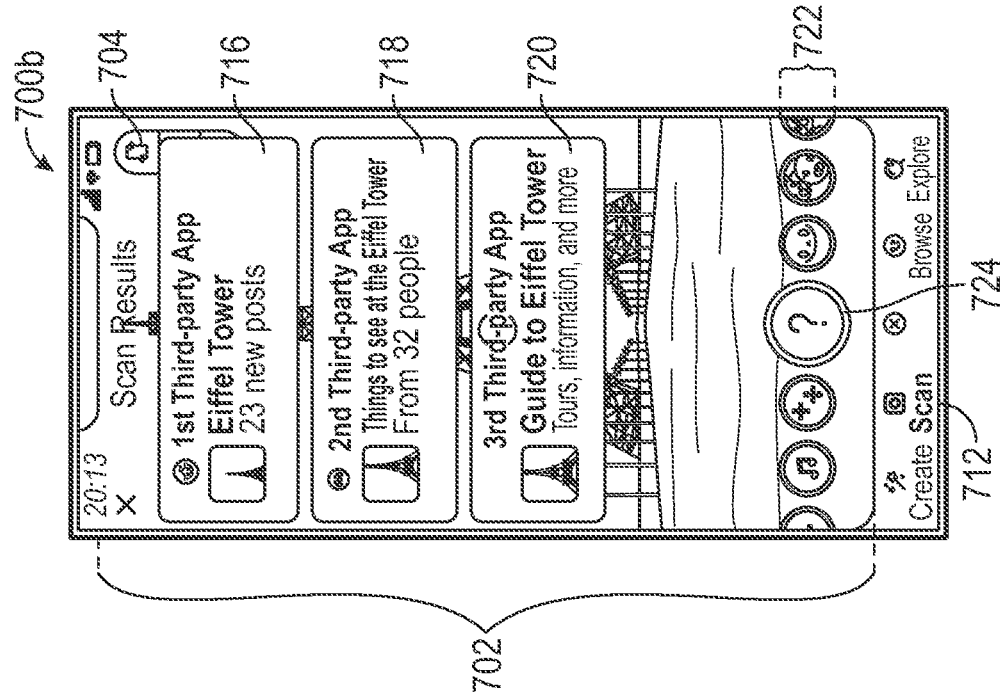
FIG. 7B illustrates an example user interface for displaying augmented reality content with a captured image in association with traveling, in accordance with some example embodiments.
Figure 7A:
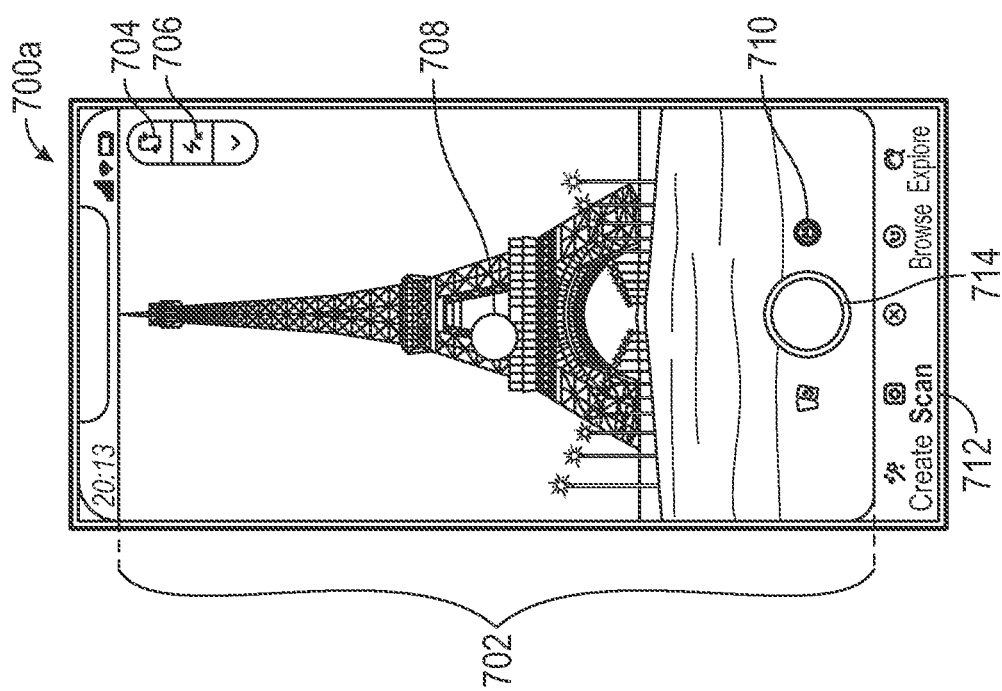
FIG. 7A illustrates an example user interface in which a user requests to display augmented reality content in association with a captured image, in accordance with some example embodiments.

FIG. 7A illustrates an example user interface 700a in which a user requests to display augmented reality content in association with a captured image, in accordance with some example embodiments. The user interface 700a includes a captured image 702, a camera selection button 704, a flash button 706, a carousel interface launch button 710, a scan button 712 and a shutter button 714.

In one or more embodiments, the user interface 700a may be presented upon startup (e.g., as a startup interface) of the messaging client 104. A user of the client device 102 may have provided touch input 708 to the messaging client 104, to perform a scan operation to identify objects in the captured image 702 (e.g., a live video feed from a rear-facing camera). For example, the touch input 708 corresponds to a press-and-hold gesture (e.g., of at least one second) at a predefined portion of the device screen. As shown in FIG. 7A, the captured image 602 depicts a landmark.

In one or more embodiments, during the scan operation, the messaging client 104 is configured to display a scanning graphic (not shown) to indicate that the messaging client 104 is performing the scan operation. For example, the scanning graphic corresponds to an animation that is displayed for the duration of the scan (e.g., a predetermined duration of 2 seconds).

In response to receiving the touch input, the messaging client 104 (e.g., in conjunction with the object detection system 212) is configured to detect objects in the captured image 702, as well as attribute(s) of the detected objects. For example, the object detection system 212 detects attribute(s) associated with the depicted landmark (e.g., a name of the landmark).

In addition, the messaging client 104 determines travel parameters associated with the touch input (e.g., one or more of a travel schedule, a transportation schedule, a general location, a specific venue or landmark, an activity, a list of participants, or a topic of interest). In one or more embodiments, the messaging client 104 determines that the name of the landmark and environmental factors (e.g., device geolocation and time) correspond with one or more of the travel parameters. In response, the messaging client 104 (in conjunction with the supplemental content system 214) is configured to determine supplemental content for presenting in association with an augmented reality content item, as discussed below with respect to FIG. 7B.

In one or more embodiments, the user interface 700*a* includes the camera selection button 704 and the flash button 706, which perform similar functions to the camera selection button 604 and flash button 606 as described above with respect to FIG. 6A. In addition, the user interface 700*a* includes a carousel interface launch button 710 for launching the carousel interface 722 discussed below with respect to FIG. 7B. Moreover, the user interface 700*a* includes the shutter button 714. User selection of the shutter button 714 provides for generating a media content item which includes an image (e.g., in response to a press/tap gesture of the shutter button 714) and/or a video (e.g., in response to a press-and-hold gesture of the shutter button 714) of the screen content, for example, to send to friends, include in a Story, and the like.

FIG. 7B illustrates an example user interface 700*b* for displaying augmented reality content with a captured image in association with traveling, in accordance with some example embodiments. The user interface 700*b* depicts the captured image 702, the camera selection button 704, and the scan button 614 of FIG. 7A. Moreover, the user interface 600*b* includes a supplemental content card 716, a supplemental content card 718, a supplemental content card 720, a carousel interface 722 and a selected AR icon 724.

Similar to the carousel interface 610 of FIG. 6A, the carousel interface 722 of FIG. 7B allows the user to cycle through and/or select different augmented reality content items to apply/display with respect to the captured image 702. In addition, the icon corresponding to an active augmented reality content item (e.g., a selected AR icon 724) is user-selectable to generate a media content item which includes an image (e.g., in response to a press/tap gesture) and/or a video (e.g., in response to a press-and-hold gesture).

In the example of FIG. 7B, the user interface 700*b* presents supplemental content in the form of the supplemental content cards 716-720. The supplemental content cards 716-720 may be presented in association with augmented reality content provided via the selected AR icon 724. Each of the supplemental content cards 716-720 may be presented as an overlay with a brief description of the landmark, and may be user-selectable to provide additional content. For example, the supplemental content card 716 includes a brief description (e.g., name of the landmark), and is user-selectable to redirect to a first third-party application with user-submitted posts regarding the landmark. In another example, the supplemental content card 718 includes a brief description (e.g., name of the landmark), and is user-selectable to redirect to a second third-party application with user-submitted comments on "things to do" with respect to the landmark. In another example, the supplemental content card 720 includes a brief description (e.g., name of the landmark), and is user-selectable to redirect to a third third-party application corresponding to a guide for the landmark.

Figure 8:
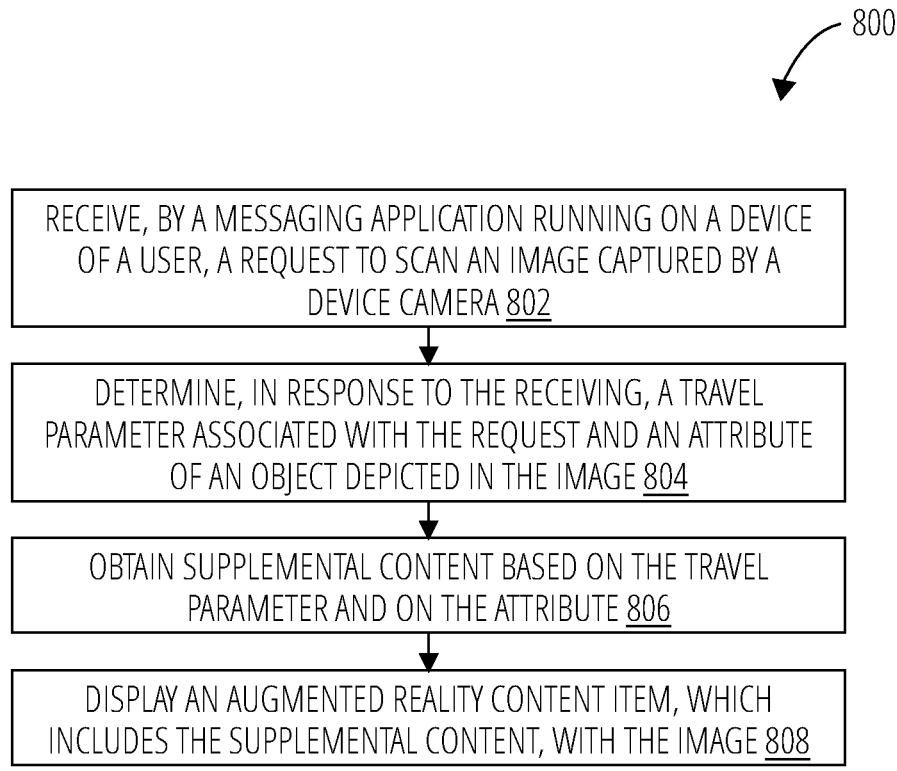
FIG. 8 is a flowchart illustrating a process for providing augmented reality content with a captured image in association with traveling, in accordance with some example embodiments.

FIG. 8 is a flowchart illustrating a process 800 for providing augmented reality content with a captured image in association with traveling, in accordance with some example embodiments. For explanatory purposes, the process 800 is primarily described herein with reference to the messaging client 104 of FIG. 1, and the object detection system 212 and the supplemental content system 214 of FIG. 2. However, one or more blocks (or operations) of the process 800 may be performed by one or more other components, and/or by other suitable devices. Further for explanatory purposes, the blocks (or operations) of the process 800 are described herein as occurring in serial, or linearly. However, multiple blocks (or operations) of the process 800 may occur in parallel or concurrently. In addition, the blocks (or operations) of the process 800 need not be performed in the order shown and/or one or more blocks (or operations) of the process 800 need not be performed and/or can be replaced by other operations. The process 800 may be terminated when its operations are completed. In addition, the process 800 may correspond to a method, a procedure, an algorithm, etc.

The messaging client 104 receives a request to scan an image captured by a device camera (block 802). The captured image may correspond to a live feed of a camera of the device. Alternatively or in addition, the captured image may correspond to a saved image included in a photo library associated with the user.

The request may correspond to user selection of an interface element for performing the scan operation. Alternatively or in addition, the request may correspond to a press-and-hold gesture performed within a predefined portion of a screen of the device.

The messaging client 104 determines a travel parameter associated with the user input and an attribute of an object depicted in the image (block 804). The travel parameter may indicate at least one of a travel schedule, a transportation schedule, a general location, a specific venue or landmark, an activity, a list of participants, or a topic of interest associated with travel by the user. The attribute of the object may be obtained in conjunction with the object detection system 212.

The messaging client 104 obtains supplemental content based on the attribute and on the travel parameter (block 806). Obtaining the supplemental content may be further based on a geolocation of the device. The supplemental content may be obtained in conjunction with the supplemental content system 214.

The messaging client 104 displays an augmented reality content item, which includes the supplemental content, with the captured image (block 808). The messaging client 104 may select, from among plural augmented reality content items, the augmented reality content item based on the attribute and the travel parameter, and activate the selected augmented reality content item prior to the displaying. Alternatively or in addition, the augmented reality content item may be selected prior to the receiving.

Figure 9:
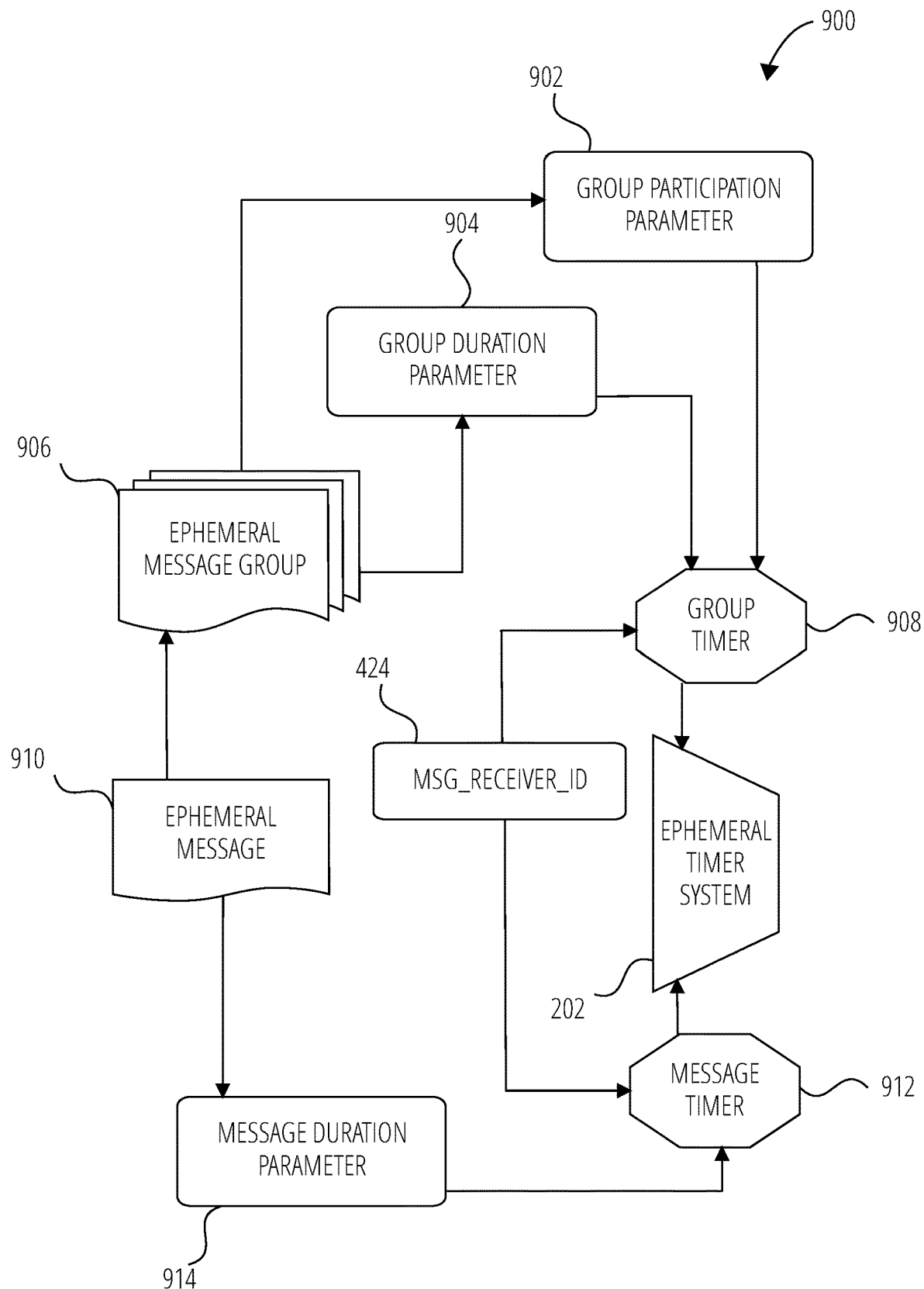
FIG. 9 is a flowchart for an access-limiting process, in accordance with some example embodiments.

FIG. 9 is a schematic diagram illustrating an access-limiting process 900, in terms of which access to content (e.g., an ephemeral message 910, and associated multimedia payload of data) or a content collection (e.g., an ephemeral message group 906) may be time-limited (e.g., made ephemeral).

An ephemeral message 910 is shown to be associated with a message duration parameter 914, the value of which determines an amount of time that the ephemeral message 910 will be displayed to a receiving user of the ephemeral message 910 by the messaging client 104. In one example, an ephemeral message 910 is viewable by a receiving user for up to a maximum of 10 seconds, depending on the amount of time that the sending user specifies using the message duration parameter 914.

The message duration parameter 914 and the message receiver identifier 424 are shown to be inputs to a message timer 912, which is responsible for determining the amount of time that the ephemeral message 910 is shown to a particular receiving user identified by the message receiver identifier 424. In particular, the ephemeral message 910 will only be shown to the relevant receiving user for a time period determined by the value of the message duration parameter 914. The message timer 912 is shown to provide output to a more generalized ephemeral timer system 202, which is responsible for the overall timing of display of content (e.g., an ephemeral message 910) to a receiving user.

The ephemeral message 910 is shown in FIG. 9 to be included within an ephemeral message group 906 (e.g., a collection of messages in a personal Story, or an event Story). The ephemeral message group 906 has an associated group duration parameter 904, a value of which determines a time duration for which the ephemeral message group 906 is presented and accessible to users of the messaging system 100. The group duration parameter 904, for example, may be the duration of a music concert, where the ephemeral message group 906 is a collection of content pertaining to that concert. Alternatively, a user (either the owning user or a curator user) may specify the value for the group duration parameter 904 when performing the setup and creation of the ephemeral message group 906.

Additionally, each ephemeral message 910 within the ephemeral message group 906 has an associated group participation parameter 902, a value of which determines the duration of time for which the ephemeral message 910 will be accessible within the context of the ephemeral message group 906. Accordingly, a particular ephemeral message group 906 may "expire" and become inaccessible within the context of the ephemeral message group 906, prior to the ephemeral message group 906 itself expiring in terms of the group duration parameter 904. The group duration parameter 904, group participation parameter 902, and message receiver identifier 424 each provide input to a group timer 908, which operationally determines, firstly, whether a particular ephemeral message 910 of the ephemeral message group 906 will be displayed to a particular receiving user and, if so, for how long. Note that the ephemeral message group 906 is also aware of the identity of the particular receiving user as a result of the message receiver identifier 424.

Accordingly, the group timer 908 operationally controls the overall lifespan of an associated ephemeral message group 906, as well as an individual ephemeral message 910 included in the ephemeral message group 906. In one example, each and every ephemeral message 910 within the ephemeral message group 906 remains viewable and accessible for a time period specified by the group duration parameter 904. In a further example, a certain ephemeral message 910 may expire, within the context of ephemeral message group 906, based on a group participation parameter 902. Note that a message duration parameter 914 may still determine the duration of time for which a particular ephemeral message 910 is displayed to a receiving user, even within the context of the ephemeral message group 906. Accordingly, the message duration parameter 914 determines the duration of time that a particular ephemeral message 910 is displayed to a receiving user, regardless of whether the receiving user is viewing that ephemeral message 910 inside or outside the context of an ephemeral message group 906.

The ephemeral timer system 202 may furthermore operationally remove a particular ephemeral message 910 from the ephemeral message group 906 based on a determination that it has exceeded an associated group participation parameter 902. For example, when a sending user has established a group participation parameter 902 of 24 hours from posting, the ephemeral timer system 202 will remove the relevant ephemeral message 910 from the ephemeral message group 906 after the specified 24 hours. The ephemeral timer system 202 also operates to remove an ephemeral message group 906 when either the group participation parameter 902 for each and every ephemeral message 910 within the ephemeral message group 906 has expired, or when the ephemeral message group 906 itself has expired in terms of the group duration parameter 904.

In certain use cases, a creator of a particular ephemeral message group 906 may specify an indefinite group duration parameter 904. In this case, the expiration of the group participation parameter 902 for the last remaining ephemeral message 910 within the ephemeral message group 906 will determine when the ephemeral message group 906 itself expires. In this case, a new ephemeral message 910, added to the ephemeral message group 906, with a new group participation parameter 902, effectively extends the life of an ephemeral message group 906 to equal the value of the group participation parameter 902.

Responsive to the ephemeral timer system 202 determining that an ephemeral message group 906 has expired (e.g., is no longer accessible), the ephemeral timer system 202 communicates with the messaging system 100 (and, for example, specifically the messaging client 104) to cause an indicium (e.g., an icon) associated with the relevant ephemeral message group 906 to no longer be displayed within a user interface of the messaging client 104. Similarly, when the ephemeral timer system 202 determines that the message duration parameter 914 for a particular ephemeral message 910 has expired, the ephemeral timer system 202 causes the messaging client 104 to no longer display an indicium (e.g., an icon or textual identification) associated with the ephemeral message 910.

Figure 10:
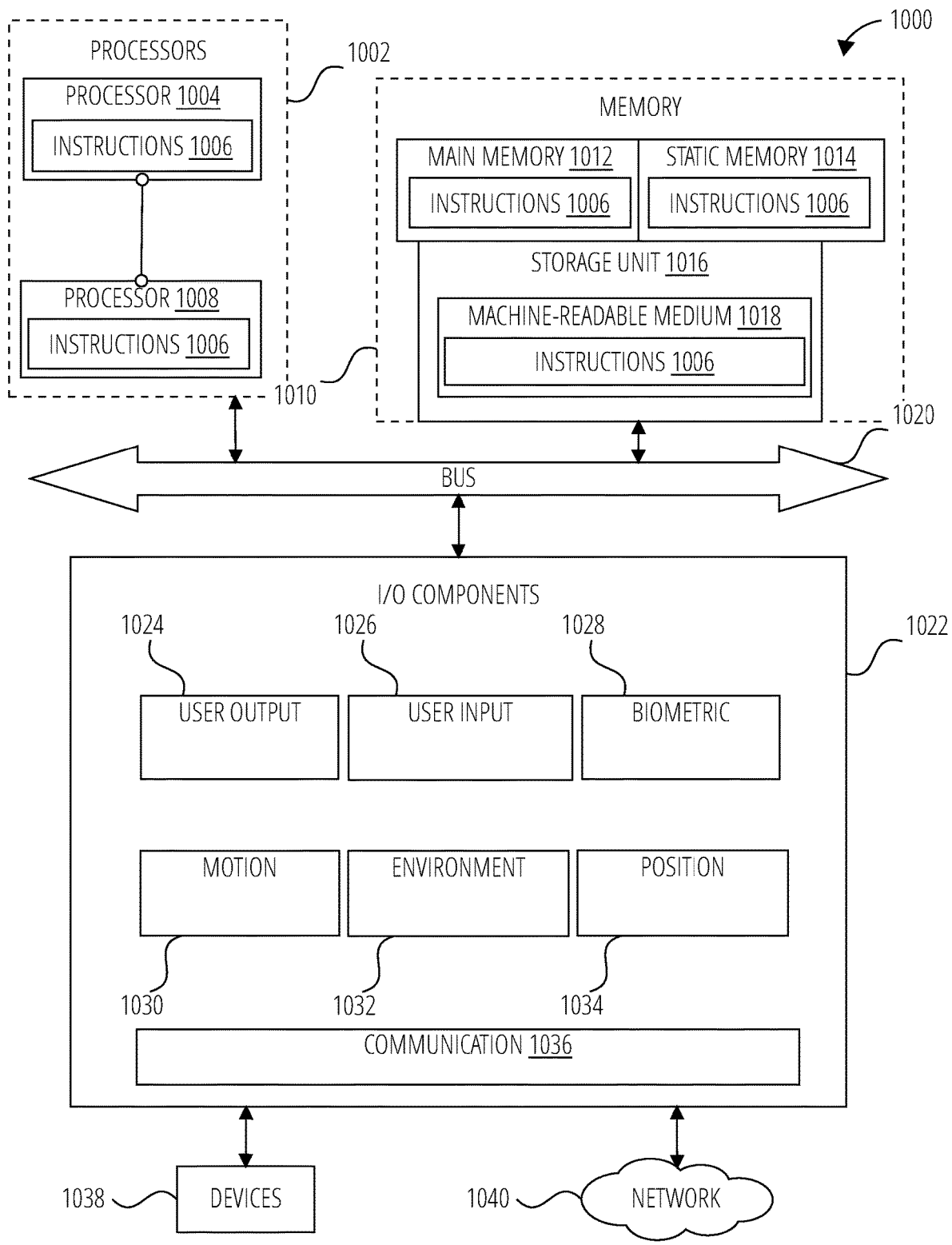
FIG. 10 is a diagrammatic representation of a machine in the form of a computer system within which a set of instructions may be executed for causing the machine to perform any one or more of the methodologies discussed herein, in accordance with some example embodiments.

FIG. 10 is a diagrammatic representation of the machine 1000 within which instructions 1006 (e.g., software, a program, an application, an applet, an app, or other executable code) for causing the machine 1000 to perform any one or more of the methodologies discussed herein may be executed. For example, the instructions 1006 may cause the machine 1000 to execute any one or more of the methods described herein. The instructions 1006 transform the general, non-programmed machine 1000 into a particular machine 1000 programmed to carry out the described and illustrated functions in the manner described. The machine 1000 may operate as a standalone device or may be coupled (e.g., networked) to other machines. In a networked deployment, the machine 1000 may operate in the capacity of a server machine or a client machine in a server-client network environment, or as a peer machine in a peer-to-peer (or distributed) network environment. The machine 1000 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1006, sequentially or otherwise, that specify actions to be taken by the machine 1000. Further, while only a single machine 1000 is illustrated, the term "machine" shall also be taken to include a collection of machines that individually or jointly execute the instructions 1006 to perform any one or more of the methodologies discussed herein. The machine 1000, for example, may comprise the client device 102 or any one of a number of server devices forming part of the messaging server system 108. In some examples, the machine 1000 may also comprise both client and server systems, with certain operations of a particular method or algorithm being performed on the server-side and with certain operations of the particular method or algorithm being performed on the client-side.

The machine 1000 may include processors 1002, memory 1010, and input/output I/O components 1022, which may be configured to communicate with each other via a bus 1020. In an example, the processors 1002 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1004 and a processor 1008 that execute the instructions 1006. The term "processor" is intended to include multi-core processors that may comprise two or more independent processors (sometimes referred to as "cores") that may execute instructions contemporaneously. Although FIG. 10 shows multiple processors 1002, the machine 1000 may include a single processor with a single-core, a single processor with multiple cores (e.g., a multi-core processor), multiple processors with a single core, multiple processors with multiples cores, or any combination thereof.

The memory 1010 includes a main memory 1012, a static memory 1014, and a storage unit 1016, both accessible to the processors 1002 via the bus 1020. The main memory 1010, the static memory 1014, and storage unit 1016 store the instructions 1006 embodying any one or more of the methodologies or functions described herein. The instructions 1006 may also reside, completely or partially, within the main memory 1012, within the static memory 1014, within machine-readable medium 1018 within the storage unit 1016, within at least one of the processors 1002 (e.g., within the Processor's cache memory), or any suitable combination thereof, during execution thereof by the machine 1000.

The I/O components 1022 may include a wide variety of components to receive input, provide output, produce output, transmit information, exchange information, capture measurements, and so on. The specific I/O components 1022 that are included in a particular machine will depend on the type of machine. For example, portable machines such as mobile phones may include a touch input device or other such input mechanisms, while a headless server machine will likely not include such a touch input device. It will be appreciated that the I/O components 1022 may include many other components that are not shown in FIG. 10. In various examples, the I/O components 1022 may include user output components 1024 and user input components 1026. The user output components 1024 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1026 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1022 may include biometric components 1028, motion components 1030, environmental components 1032, or position components 1034, among a wide array of other components. For example, the biometric components 1028 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1030 include acceleration sensor components (e.g., accelerometer), gravitation sensor components, rotation sensor components (e.g., gyroscope).

The environmental components 1032 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360° camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera and a depth sensor, for example.

The position components 1034 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1022 further include communication components 1036 operable to couple the machine 1000 to a network 1040 or devices 1038 via respective coupling or connections. For example, the communication components 1036 may include a network interface Component or another suitable device to interface with the network 1040. In further examples, the communication components 1036 may include wired communication components, wireless communication components, cellular communication components, Near Field Communication (NFC) components, Bluetooth® components (e.g., Bluetooth® Low Energy), WiFi® components, and other communication components to provide communication via other modalities. The devices 1038 may be another machine or any of a wide variety of peripheral devices (e.g., a peripheral device coupled via a USB).

Moreover, the communication components 1036 may detect identifiers or include components operable to detect identifiers. For example, the communication components 1036 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1036, such as location via Internet Protocol (IP) geolocation, location via Wi-Fi® signal triangulation, location via detecting an NFC beacon signal that may indicate a particular location, and so forth.

The various memories (e.g., main memory 1012, static memory 1014, and memory of the processors 1002) and storage unit 1016 may store one or more sets of instructions and data structures (e.g., software) embodying or used by any one or more of the methodologies or functions described herein. These instructions (e.g., the instructions 1006), when executed by processors 1002, cause various operations to implement the disclosed examples.

The instructions 1006 may be transmitted or received over the network 1040, using a transmission medium, via a network interface device (e.g., a network interface component included in the communication components 1036) and using any one of several well-known transfer protocols (e.g., hypertext transfer protocol (HTTP)). Similarly, the instructions 1006 may be transmitted or received using a transmission medium via a coupling (e.g., a peer-to-peer coupling) to the devices 1038.

Figure 11:
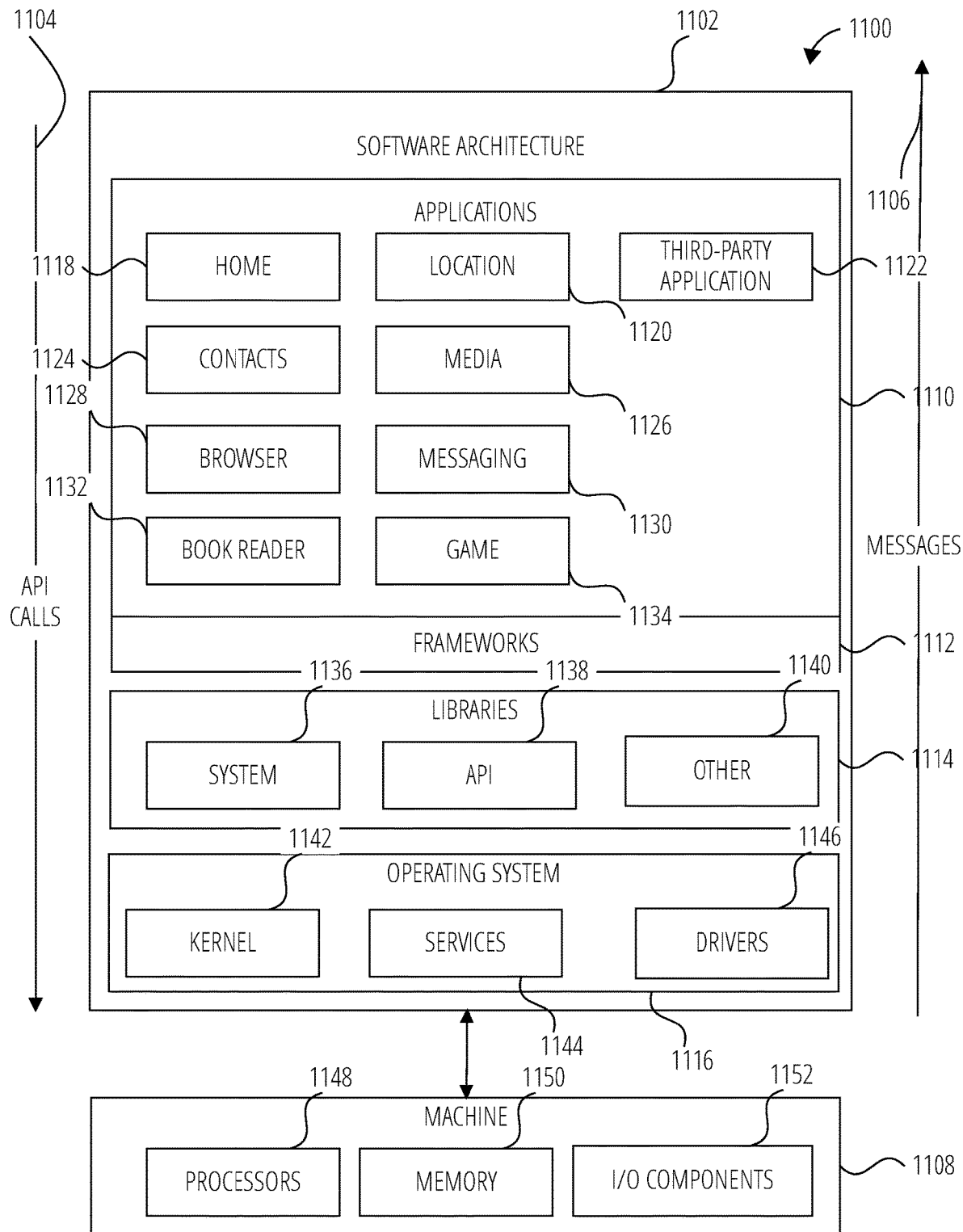
FIG. 11 is a block diagram showing a software architecture within which examples may be implemented, in accordance with some example embodiments.

FIG. 11 is a block diagram 1100 illustrating a software architecture 1102, which can be installed on any one or more of the devices described herein. The software architecture 1102 is supported by hardware such as a machine 1108 that includes processors 1148, memory 1150, and I/O components 1152. In this example, the software architecture 1102 can be conceptualized as a stack of layers, where each layer provides a particular functionality. The software architecture 1102 includes layers such as an operating system 1116, libraries 1114, frameworks 1112, and applications 1110. Operationally, the applications 1110 invoke API calls 1104 through the software stack and receive messages 1106 in response to the API calls 1104.

The operating system 1116 manages hardware resources and provides common services. The operating system 1116 includes, for example, a kernel 1142, services 1144, and drivers 1146. The kernel 1142 acts as an abstraction layer between the hardware and the other software layers. For example, the kernel 1142 provides memory management, processor management (e.g., scheduling), component management, networking, and security settings, among other functionality. The services 1144 can provide other common services for the other software layers. The drivers 1146 are responsible for controlling or interfacing with the underlying hardware. For instance, the drivers 1146 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1114 provide a common low-level infrastructure used by the applications 1110. The libraries 1114 can include system libraries 1136 (e.g., C standard library) that provide functions such as memory allocation functions, string manipulation functions, mathematic functions, and the like. In addition, the libraries 1114 can include API libraries 1138 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1114 can also include a wide variety of other libraries 1140 to provide many other APIs to the applications 1110.

The frameworks 1112 provide a common high-level infrastructure that is used by the applications 1110. For example, the frameworks 1112 provide various graphical user interface (GUI) functions, high-level resource management, and high-level location services. The frameworks 1112 can provide a broad spectrum of other APIs that can be used by the applications 1110, some of which may be specific to a particular operating system or platform.

In an example, the applications 1110 may include a home application 1118, a contacts application 1124, a browser application 1128, a book reader application 1132, a location application 1120, a media application 1126, a messaging application 1130, a game application 1134, and a broad assortment of other applications such as a third-party application 1122. The applications 1110 are programs that execute functions defined in the programs. Various programming languages can be employed to create one or more of the applications 1110, structured in a variety of manners, such as object-oriented programming languages (e.g., Objective-C, Java, or C++) or procedural programming languages (e.g., C or assembly language). In a specific example, the third-party application 1122 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third-party application 1122 can invoke the API calls 1104 provided by the operating system 1116 to facilitate functionality described herein.

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein. A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time. Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

What is claimed is:

1. A method, comprising:
   determining a travel parameter associated with an attribute of an object depicted in an image;
   identifying a plurality of supplemental content items corresponding to the travel parameter and attribute of the object;
   computing relevancy scores for the plurality of supplemental content items;
   selecting a portion of the plurality of supplemental content items based on the computed relevancy scores to limit a number of supplemental content items that are displayed; and
   activating an augmented reality item that includes the portion of the plurality of supplemental content items.

2. The method of claim 1, wherein the travel parameter indicates at least one of a travel schedule, a transportation schedule, or a list of participants traveling.

3. The method of claim 1, further comprising:
   receiving, by an interaction application running on a device of a user, a request to scan the image captured by a camera, wherein the augmented reality item is displayed with the image.

4. The method of claim 1, wherein the travel parameter further indicates at least one of a general location, a specific venue or landmark, an activity, or a topic of interest associated with travel by a user.

5. The method of claim 1, further comprising receiving input comprising a press-and-hold gesture performed within a predefined portion of a screen of a device to activate the augmented reality item.

6. The method of claim 1, further comprising receiving user selection of an interface element for performing a scan.

7. The method of claim 1, wherein the portion of the plurality of supplemental content items is selected is based on a geolocation of a device.

8. The method of claim 1, wherein the image corresponds to a live feed of a camera of a device.

9. The method of claim 1, wherein the image corresponds to a saved image included in a photo library associated with a user.

10. A system, comprising:
    one or more processors configured to perform operations comprising:
    determining a travel parameter associated with an attribute of an object depicted in an image;
    identifying a plurality of supplemental content items corresponding to the travel parameter and attribute of the object;
    computing relevancy scores for the plurality of supplemental content items;

selecting a portion of the plurality of supplemental content items based on the computed relevancy scores to limit a number of supplemental content items that are displayed; and activating an augmented reality item that includes the portion of the plurality of supplemental content items.

11. The system of claim 10, wherein the travel parameter indicates at a list of participants traveling.

12. The system of claim 11, wherein the portion of the plurality of supplemental content items is selected based on a geolocation of a device.

13. The system of claim 11, wherein the image corresponds to a live feed of a camera of a device.

14. The system of claim 11, wherein the image corresponds to a saved image included in a photo library associated with a user.

15. The system of claim 10, wherein the operations comprise:

ranking the plurality of supplemental content items based on a number or frequency of confirmed matches between matching search parameters comprising the travel parameter and attribute of the object.

16. The system of claim 10, wherein the portion of the plurality of supplemental content items are presented as the augmented reality item in ranked order.

17. The system of claim 10, wherein the object comprises a painting, and wherein activating the augmented reality item comprises replacing one or more facial regions of the painting with facial features of a user's face.

18. The system of claim 10, the operations comprising receiving input comprising a press-and-hold gesture performed within a predefined portion of a screen of a device to activate the augmented reality item.

19. A non-transitory computer-readable storage medium, the computer-readable storage medium including instructions that when executed by a computer, cause the computer to perform operations comprising:

determining a travel parameter associated with an attribute of an object depicted in an image;

identifying a plurality of supplemental content items corresponding to the travel parameter and attribute of the object;

computing relevancy scores for the plurality of supplemental content items;

selecting a portion of the plurality of supplemental content items based on the computed relevancy scores to limit a number of supplemental content items that are displayed; and activating an augmented reality item that includes the portion of the plurality of supplemental content items.

20. The non-transitory computer-readable storage medium of claim 19, wherein the augmented reality item is generated using a template with placeholders for one or more of the plurality of supplemental content items.

* * * * *